(12) United States Patent
Esaki et al.

(10) Patent No.: US 8,872,437 B2
(45) Date of Patent: Oct. 28, 2014

(54) LIGHTING APPARATUS AND ILLUMINATING FIXTURE WITH THE SAME

(71) Applicant: Panasonic Corporation, Osaka (JP)

(72) Inventors: Sana Esaki, Osaka (JP); Akinori Hiramatu, Nara (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 13/692,003

(22) Filed: Dec. 3, 2012

(65) Prior Publication Data

US 2013/0141003 A1   Jun. 6, 2013

(30) Foreign Application Priority Data

Dec. 5, 2011   (JP) ................. 2011-265720

(51) Int. Cl.
*H05B 37/02* (2006.01)
*H05B 33/08* (2006.01)

(52) U.S. Cl.
CPC ............ *H05B 37/02* (2013.01); *H05B 33/0815* (2013.01); *Y02B 20/346* (2013.01)
USPC .......................................... 315/224; 315/297

(58) Field of Classification Search
USPC ................... 315/200 R, 224, 291, 297, 307
See application file for complete search history.

(56) References Cited

U.S. PATENT DOCUMENTS

| | | | |
|---|---|---|---|
| 6,580,309 | B2 | 6/2003 | Jacobs et al. |
| 2001/0024112 | A1 | 9/2001 | Jacobs et al. |
| 2003/0132721 | A1 | 7/2003 | Jacobs et al. |
| 2010/0026208 | A1 | 2/2010 | Shteynberg et al. |
| 2010/0141155 | A1 | 6/2010 | Hong et al. |
| 2010/0148683 | A1 | 6/2010 | Zimmerman et al. |
| 2010/0295478 | A1 | 11/2010 | Wei et al. |
| 2011/0101877 | A1 | 5/2011 | Zhan et al. |
| 2011/0109248 | A1 | 5/2011 | Liu |
| 2013/0147356 | A1* | 6/2013 | Masumoto .................... 315/121 |

FOREIGN PATENT DOCUMENTS

| | | |
|---|---|---|
| JP | 2003-522393 A | 7/2003 |
| JP | 2005-294063 A | 10/2005 |

OTHER PUBLICATIONS

Extended European Search Report for corresponding European Application No. 12195190.9 dated Apr. 11, 2013.

* cited by examiner

*Primary Examiner* — Don Le
(74) *Attorney, Agent, or Firm* — Renner, Otto, Boisselle & Sklar, LLP

(57) ABSTRACT

The lighting apparatus in accordance with the present invention includes: a switching regulator including a switching element; and a control circuit configured to adjust a switching frequency and on-duration of the switching element in accordance with a dimming ratio. The control circuit is configured to, when the dimming ratio falls within a first dimming range, adjust the switching frequency to a frequency associated with the first dimming range and adjust the on-duration to duration corresponding to the dimming ratio. The control circuit is configured to, when the dimming ratio falls within a second dimming range, adjust the on-duration to duration associated with the second dimming range and adjust the switching frequency to a frequency corresponding to the dimming ratio.

13 Claims, 14 Drawing Sheets

LIGHTING APPARATUS AND ILLUMINATING FIXTURE WITH THE SAME

TECHNICAL FIELD

The present invention relates to lighting apparatuses and illuminating fixtures with the same, and more particularly to a lighting apparatus capable of dimming a semiconductor light emitting element and an illuminating fixture with the same.

BACKGROUND ART

Recently, illuminating fixtures using a semiconductor light emitting element such as a light emitting diode (an LED), an organic electroluminescence (EL) element, and the like, as a light source have been proliferated.

The type of illuminating fixture is provided with, for example, a lighting apparatus (an LED lighting apparatus) having a configuration as shown in FIG. 20 (see Document 1 [JP 2005-294063 A]).

This lighting apparatus includes a (first) switching element 92, an inductor 93, and a diode 95. The (first) switching element 92 and the inductor 93 are connected in series with a DC power supply 91. The diode 95 constitutes a closed circuit in combination with the inductor 93 and a light source load (light emitting diode) 94 while the switching element 92 is turned off.

This lighting apparatus is a self-excited type, and controls on-off operation of the switching element 92, thereby supplying electromagnetic energy stored in the inductor 93 while the switching element 92 is turned on, to the light source load 94 through the diode 95 while the switching element 92 is turned off.

In addition, this lighting apparatus includes a resistor 96 for measuring a current flowing through the switching element 92. The lighting apparatus varies on-duration of the switching element 92 in accordance with the current measured by use of the resistor 96. Thus, a current flowing through the light source load 94 can be kept constant by means of a self-excited type lighting circuit. However, the lighting apparatus in Document 1 is a self-excited type and does not have a dimming function. It is therefore impossible to dim the light source load.

Meanwhile, Document 2 (JP 2003-522393 A) discloses that supply power to a light source load (an LED lighting module) is turned on and off at a burst frequency of 100 Hz or 120 Hz synchronized with a frequency (50 or 60 Hz) of an AC power supply (a main power supply voltage).

The lighting apparatus (a power supply assembly) can control a length of a pulse in which the supply power to the light source load is in an On state, thereby performing a dimming control. However, a specific circuit configuration for dimming is not disclosed in Document 2.

However, as described in Document 2, in the lighting apparatus configured to perform dimming by controlling a pulse length (an On time), when a dimming ratio is small (dark), the On time in one period of the burst frequency is short, which may cause flicker. For this reason, in the lighting apparatus, a range of selectable dimming ratios is difficult to be set widely.

SUMMARY OF INVENTION

In view of the above insufficiency, the present invention is directed to a lighting apparatus capable of widening a dimming range of a light source load with a relatively simple configuration and an illuminating fixture with the same.

The lighting apparatus of the first aspect in accordance with the present invention includes: a switching regulator configured to supply a direct current to a DC light source; and a control circuit configured to control the switching regulator in order to supply a direct current having a magnitude corresponding to a dimming ratio to the DC light source. The switching regulator includes a switching element. The control circuit is configured to adjust a switching frequency and on-duration of the switching element in accordance with the dimming ratio. The control circuit is configured to, when the dimming ratio falls within a first dimming range, adjust the switching frequency to a frequency associated with the first dimming range and adjust the on-duration to duration associated with the dimming ratio in a range of the on-duration associated with the first dimming range. The control circuit is configured to, when the dimming ratio falls within a second dimming range different from the first dimming range, adjust the on-duration to duration associated with the second dimming range and adjust the switching frequency to a frequency associated with the dimming ratio in a range of the switching frequency associated with the second dimming range.

In the lighting apparatus of the second aspect in accordance with the present invention, in addition to the first aspect, the control circuit is configured to, when the control circuit lights the DC light source at full power, adjust the switching frequency to a predetermined standard frequency and adjust the on-duration to predetermined standard on-duration. A combination of the standard frequency and the standard on-duration is a combination of the switching frequency and the on-duration associated with luminance of the DC light source used as a unit amount of the dimming ratio.

In the lighting apparatus of the third aspect in accordance with the present invention, in addition to the second aspect, the switching regulator includes an inductor connected in series with the switching element. The switching regulator is configured to store energy from a power source in the inductor while the switching element is turned on, and to provide the energy stored in the inductor to the DC light source while the switching element is turned off. The standard frequency and the standard on-duration are selected such that a current flows through the inductor in a critical mode or a discontinuous mode.

In the lighting apparatus of the fourth aspect in accordance with the present invention, in addition to any one of the first to third aspects, the control circuit is configured to output a driving signal in accordance with the dimming ratio to the switching element. The driving signal is a periodic voltage signal, and has an on-period in which the driving signal has a voltage exceeding a threshold for turning on the switching element, and an off-period in which the driving signal has the voltage falling below the threshold. The on-duration is determined by to the on-period of the driving signal. The switching frequency is determined by a frequency of the driving signal.

In the lighting apparatus of the fifth aspect in accordance with the present invention, in addition to the fourth aspect, the control circuit is configured to measure a driving current flowing from the control circuit to the switching element while the driving signal is outputted. The control circuit is configured to, when the driving current rises to a first predetermined value, switch the driving signal from the on-period to the off-period. The control circuit is configured to adjust the on-duration by means of adjusting the first predetermined value.

In the lighting apparatus of the sixth aspect in accordance with the present invention, in addition to the fifth aspect, the control circuit is configured to adjust the first predetermined value to a value not greater than zero in order to turn off the DC light source.

In the lighting apparatus of the seventh aspect in accordance with the present invention, in addition to the fourth or fifth aspect, the control circuit includes: a capacitor charged with the driving signal; and a discharging speed circuit configured to determine a discharging speed of the capacitor in accordance with a second predetermined value. The control circuit is configured to, when a voltage across the capacitor decreases down to a predetermined threshold, switch the driving signal from the off-period to the on-period. The control circuit is configured to adjust the frequency of the driving signal by means of adjusting the second predetermined value.

In the lighting apparatus of the eighth aspect in accordance with the present invention, in addition to the seventh aspect, the control circuit is configured to adjust the second predetermined value to a value not greater than zero in order to turn off the DC light source.

In the lighting apparatus of the ninth aspect in accordance with the present invention, in addition to any one of the first to eighth aspects, the control circuit is configured to receive a dimming signal indicative of the dimming ratio.

In the lighting apparatus of the tenth aspect in accordance with the present invention, in addition to any one of the first to ninth aspects, a minimum of the switching frequency is 1 kHz.

In the lighting apparatus of the eleventh aspect in accordance with the present invention, in addition to any one of the first to tenth aspects, the first dimming range is defined as a range having a lower limit not less than a predetermined dimming ratio. The second dimming range is defined as a range having an upper limit less than the predetermined dimming ratio. The range of the switching frequency associated with the second dimming range has an upper limit not greater than the frequency associated with the first dimming range. The duration associated with the second dimming range is not greater than the duration associated with the predetermined dimming ratio in the range of the on-duration associated with the first dimming range.

In the lighting apparatus of the twelfth aspect in accordance with the present invention, in addition to any one of the first to tenth aspects, the second dimming range is defined as a range having a lower limit not less than a predetermined dimming ratio. The first dimming range is defined as a range having an upper limit less than the predetermined dimming ratio. The range of the on-duration associated with the first dimming range has an upper limit not greater than the duration associated with the second dimming range. The frequency associated with the first dimming range is not greater than the frequency associated with the predetermined dimming ratio in the range of the switching frequency associated with the second dimming range.

The illuminating fixture of the thirteenth aspect in accordance with the present invention includes: a lighting apparatus defined by any one of the first to twelfth aspects; and a DC light source configured to receive electric power from the lighting apparatus.

DESCRIPTION OF EMBODIMENTS

First Embodiment

Figure 1:
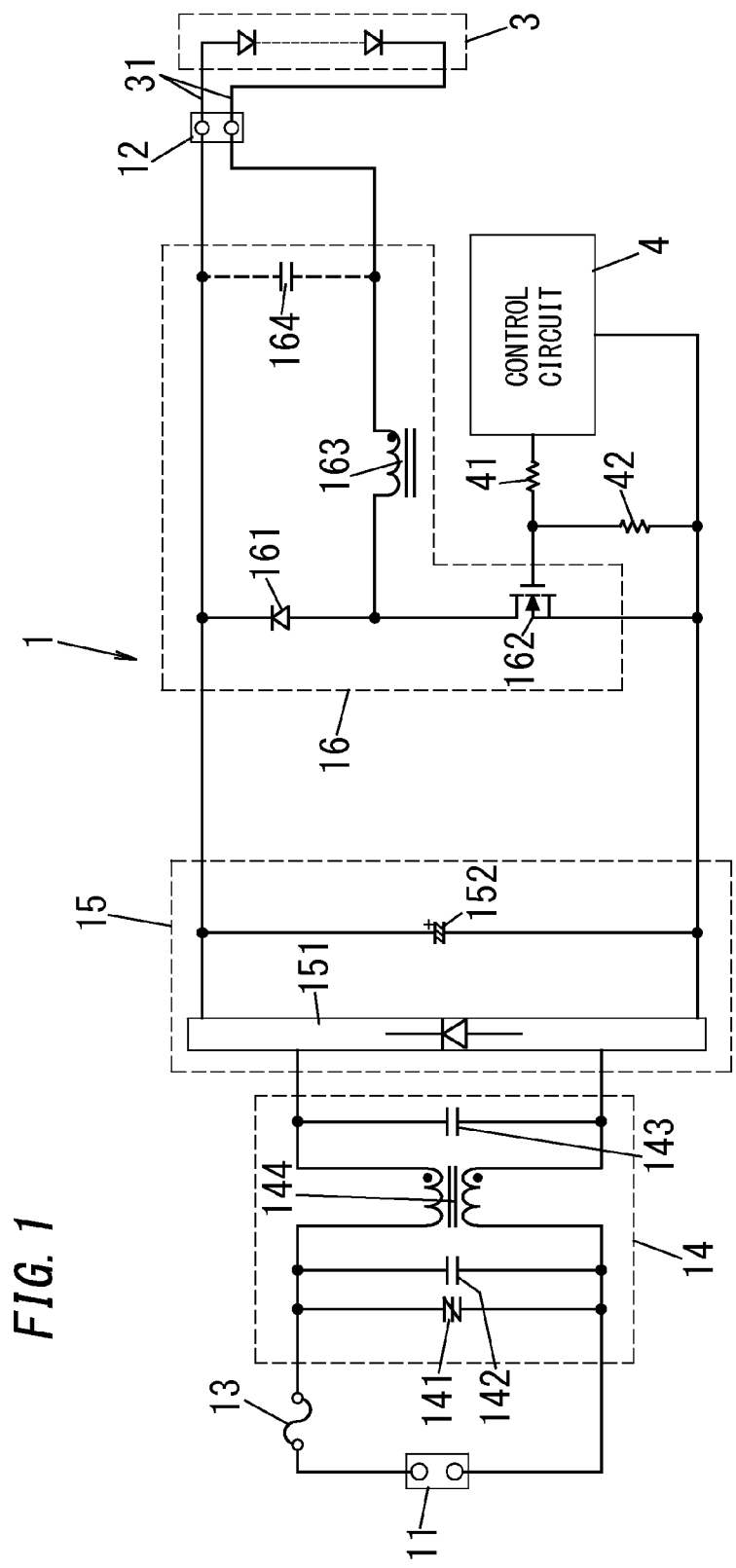
FIG. 1 is a circuit diagram illustrating the configuration of the lighting apparatus of the first embodiment.

As shown in FIG. 1, a lighting apparatus 1 according to the present embodiment includes a power supply connector 11 adapted to be connected to an AC power supply 2 (see FIG. 8) such as a commercial power supply, and an output connector 12 adapted to be connected to a light source load 3 comprising a semiconductor light emitting element such as a light emitting diode (LED) through lead wires 31.

The light source load 3 is adapted to be lit by a DC output current supplied from the lighting apparatus 1. The light source load 3 may be an LED module formed of a plurality of (for example, thirty) light emitting diodes connected in series, in parallel, or in series and parallel. Besides, the light source load 3 is a DC light source designed to operate with DC power. It is sufficient that the light source load 3 is configured to emit light having intensity corresponding to an amount of a received direct current.

The lighting apparatus 1 includes: a DC power supply generation unit having a filter circuit 14 and a DC power supply circuit 15; a step-down chopper circuit (a buck converter) 16; and a control circuit 4, as main components. A basic configuration of the lighting apparatus 1 will be hereinafter described with reference to FIG. 1.

The power supply connector 11 is connected to the DC power supply circuit 15 through a current fuse 13 and the filter circuit 14.

The filter circuit 14 includes: a surge voltage absorbing device 141 and a filter capacitor 142 connected in parallel with the power supply connector 11 through the current fuse 13; a filter capacitor 143; and a common mode choke coil 144. The filter circuit 14 is configured to cut noise. The filter capacitor 143 is connected between input terminals of the DC power supply circuit 15. The common mode choke coil 144 is inserted between the two filter capacitors 142 and 143.

Herein, the DC power supply circuit 15 is a rectifying and smoothing circuit including a full-wave rectifier 151 and a smoothing capacitor 152, but it is not limited thereto. For example, the DC power supply circuit 15 may be a power correction circuit (a power factor improving circuit) including a step-up chopper circuit.

By the above configuration, the DC power supply generation unit including the filter circuit 14 and the DC power supply circuit 15 converts an AC voltage (100 V, 50 or 60 Hz) from an AC power supply 2 into a DC voltage (about 140 V) and outputs the converted DC voltage from the output terminals (both terminals of the smoothing capacitor 152) thereof.

The DC power supply circuit 15 has output terminals (both terminals of the smoothing capacitor 152) connected to the step-down chopper circuit 16. The step-down chopper circuit 16 has output terminals connected to the output connector 12.

The step-down chopper circuit 16 is defined as a switching regulator configured to supply a direct current to the light source load (DC light source) 3. The step-down chopper circuit 16 includes: a diode (a regenerative diode) 161 and a switching element 162 connected in series to each other and connected between the output terminals of the DC power supply circuit (the DC power supply) 15; and an inductor 163 connected in series to the light source load 3 between both ends of the diode 161.

In this configuration, the diode 161 is installed so that a cathode of the diode 161 is connected to an output terminal of a positive side of the DC power supply circuit 15. That is, the switching element 162 is arranged to be inserted between a series circuit of the inductor 163 and the light source load 3 connected in parallel with the diode 161, and an output terminal of a negative side of the DC power supply circuit 15. A function of the diode 161 will be described below.

Figure 6:
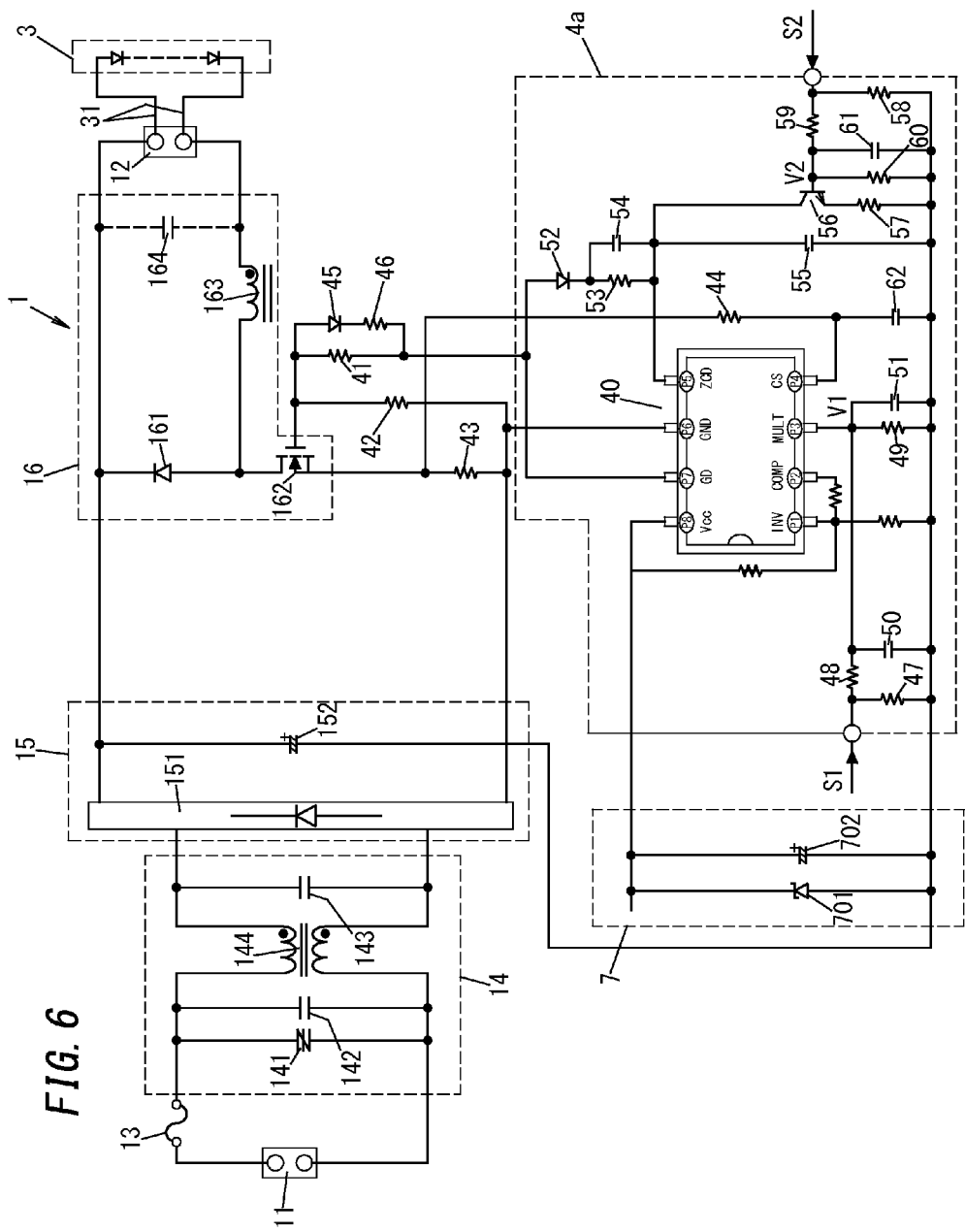
FIG. 6 is a circuit diagram illustrating the configuration of the lighting apparatus of the first embodiment.

The step-down chopper circuit 16 also includes an output capacitor 164 (in FIGS. 1 and 6, illustrated by dashed lines). The output capacitor 164 is connected between output terminals thereof (between both terminals of the output connector 12) and is connected in parallel with the light source load 3. The output capacitor 164 serves to smooth a pulsation component (ripple) of the output current supplied to the light source load 3 from the output connector 12. Besides, the output capacitor 164 is optional.

The control circuit 4 is configured to control the step-down chopper circuit (switching regulator) 16 in order to supply a direct current having a magnitude corresponding to a dimming ratio to the light source load (DC light source) 3. The control circuit 4 is configured to adjust a switching frequency and on-duration of the switching element 162 in accordance with the dimming ratio. The on-duration is defined as time of one period during which the switching element 162 is consecutively turned on.

The control circuit 4 is adapted to turn on and off the switching element 162 of the step-down chopper circuit 16 at a high frequency. In an example of FIG. 1, the switching element 162 includes a metal oxide semiconductor field effect transistor (MOSFET). The control circuit 4 is adapted to supply a gate signal (driving signal) between a gate and a source of the switching element 162, thereby turning the switching element 162 on and off.

The control circuit 4 is configured to output the driving signal in accordance with the dimming ratio to the switching element 162. The driving signal is a periodic voltage signal, and has an on-period in which the driving signal has a voltage exceeding a threshold for turning on the switching element 162, and an off-period in which the driving signal has the voltage falling below the threshold. The on-duration is determined by to the on-period of the driving signal. The switching frequency is determined by a frequency of the driving signal.

In the present embodiment, the driving signal is a binary signal which has a voltage exceeding a threshold for turning on the switching element 162 and a voltage falling below the threshold.

Figure 2:
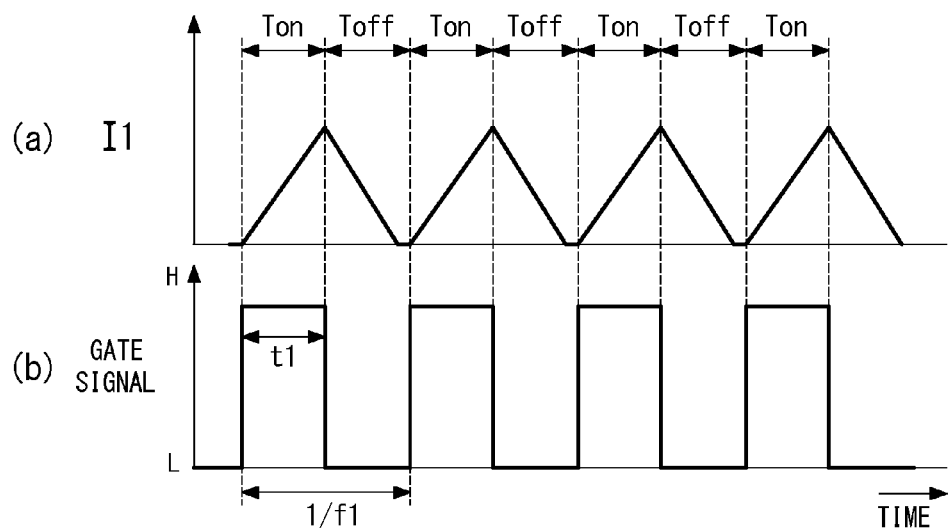
FIG. 2 is an explanation diagram illustrating the operation of the lighting apparatus in the full lighting state according to the first embodiment.

More specifically, the control circuit 4 outputs the gate signal (see FIG. 2 (b)) having a rectangular wave form in which a high (H) level and a low (L) level are alternately repeated. The switching element 162 is turned on while the gate signal is in a period of the H level. The switching element 162 is turned off while the gate signal is in a period of the L level.

Besides, the driving signal is not limited to a binary signal. In brief, the driving signal may be selected from a sinusoidal wave signal, a rectangular wave signal, a triangular wave signal, and a sawtooth wave signal.

In the example of FIG. 1, the control circuit 4 has an output terminal for outputting the gate signal, and this output terminal of the control circuit 4 is connected to the output terminal of the negative side of the DC power supply circuit 14 through a series circuit of resistors 41 and 42. Connected to a gate terminal of the switching element 162 is a connection point of the two resistors 41 and 42.

However, the control circuit 4 has three modes, that is, a first control mode, a second control mode, and a third control mode as control modes of the switching element 162.

The control circuit 4 is configured to select the second control mode or the third control mode according to a dimming ratio designated from the outside, thereby dimming the light source load 3 based on the designated dimming ratio. In the present embodiment, a range of the dimming ratio is divided into a plurality of intervals. The second control mode or the third control mode is preliminarily allocated for each of at least two intervals of the divided intervals.

In the first control mode, the control circuit 4 is configured to turn the switching element 162 on and off at a predetermined oscillating frequency (switching frequency) and on-duration (on-duration per one period) so that, as an intermittent mode, a current (an electric current) discontinuously flows through the inductor 163.

The first control mode is a control mode for lighting the light source load 3 at full power. The control circuit 4 is configured to, when the control circuit 4 lights the light source load 3 at full power, adjust the switching frequency to a predetermined standard frequency and adjust the on-duration to predetermined standard on-duration. A combination of the standard frequency and the standard on-duration is selected based on a combination of the switching frequency and the on-duration associated with luminance of the light source load 3 used as a unit amount of the dimming ratio.

The intermittent mode mentioned herein, which is a mode in which a sleep interval (an interval in which a current becomes zero) is generated in the current flowing through the inductor 163, includes a critical mode in which the switching element 162 is turned on when the current flowing through the inductor 163 becomes zero. That is, the intermittent mode includes a critical mode and a discontinuous mode. The critical mode is a mode in which the current flowing through the inductor 163 becomes zero only for a moment. The discontinuous mode is a mode in which the state in which a current becomes zero every period of the current flowing through the inductor 163 is continued for a predetermined period.

In brief, a combination of the standard frequency and the standard on-duration is selected such that a current flows through the inductor 163 in the critical mode or the discontinuous mode.

In the second control mode, the control circuit 4 is configured to approximately fix the oscillating frequency of the switching element 162 within each of the aforementioned intervals and to change the on-duration of the switching element 162.

In other words, the control circuit 4 is configured to, when the dimming ratio falls within a dimming range (first dimming range) associated with the second control mode, adjust the switching frequency (oscillating frequency) to a frequency associated with the first dimming range and adjust the on-duration to duration associated with the dimming ratio in a range of the on-duration associated with the first dimming range.

Unlike the second control mode, in the third control mode, the control circuit 4 is configured to approximately fix the on-duration of the switching element 162 within each of the intervals and to change the oscillating frequency of the switching element 162.

In other words, the control circuit 4 is configured to, when the dimming ratio falls within a dimming range (second dimming range) associated with the third control mode, adjust the on-duration to duration associated with the second dimming range and adjust the switching frequency (oscillating frequency) to a frequency associated with the dimming ratio in a range of the switching frequency associated with the second dimming range.

The control circuit 4 is configured to select the first control mode to fully light the light source load 3, if a full lighting mode for fully lighting the light source load 3 is designated. Meanwhile, if a dimming mode for dimming the light source load 3 at a dimming ratio is designated, the control circuit 4 is configured to select one of the second and third control modes according to an interval (dimming range) corresponding to the designated dimming ratio, thereby dimming the light source load 3 according to the designated dimming ratio.

Here, in the second control mode, the oscillating frequency is approximately fixed within the interval. Therefore, a preset value of the oscillating frequency is preliminarily associated with the interval (first dimming range) for which the second control mode is allocated.

In the third control mode, the on-duration is approximately fixed within the interval. Therefore, a preset value of the on-duration is preliminarily associated with the interval (second dimming range) for which the third control mode is allocated.

For example, when a dimming ratio included in the interval corresponding to the second control mode is designated, the control circuit 4 selects the second control mode and approximately fixes the oscillating frequency to the preset value (the oscillating frequency) that is allocated to the interval and changes the on-duration to dim the light source load 3.

In contrast, when a dimming ratio included in the interval corresponding to the third control mode is designated, the control circuit 4 selects the third control mode and approximately fixes the on-duration to the preset value (the on-duration) that is allocated to the interval and changes the oscillating frequency to dim the light source load 3.

Next, an operation of the foregoing lighting apparatus 1 is described as being divided into a full lighting state in which the light source load 3 is fully lit and each of first to third dimming states in which the light source load 3 is dimmed.

For example, the range of the dimming ratio includes a first interval (first dimming interval), a second interval (second dimming interval), and a third interval (third dimming interval).

The first interval is defined as an interval in which the dimming ratio is not less than 70% but is less than 95%. The first interval serves as the first dimming range associated with the second control mode. In the first interval, the switching frequency is fixed to a frequency f2, and the on-duration is selected from a range of t2 to t2' (t2<t2') in accordance with the dimming ratio. Besides, t2 represents duration corresponding to a minimum value of the dimming ratio included in the first interval, and t2' represents duration corresponding to a maximum value of the dimming ratio included in the first interval. As mentioned in the above, the frequency f2 and the range of the on-duration of t2 to t2' are allocated to the first interval.

The second interval is defined as an interval in which the dimming ratio is not less than 20% but is less than 70%. The second interval serves as the second dimming range associated with the third control mode. In the second interval, the on-duration is fixed to duration t3, and the switching frequency is selected from a range of f3 to f3' (f3<f3') in accordance with the dimming ratio. Besides, f3 represents a frequency corresponding to a minimum value of the dimming ratio included in the second interval, and f3' represents a frequency corresponding to a maximum value of the dimming ratio included in the second interval. As mentioned in the above, the on-duration t3 and the range of the switching frequency of f3 to f3' are allocated to the second interval.

Herein, the first interval (the first dimming range) is defined as a range having a lower limit not less than a predetermined dimming ratio (70%). The second interval (the second dimming range) is defined as a range having an upper limit less than the predetermined dimming ratio (70%). The range of the switching frequency associated with the second interval (the second dimming range) has the upper limit f3' not greater than the frequency f2 associated with the first interval (the first dimming range). The duration t3 associated with the second interval (the second dimming range) is not greater than the duration t2 associated with the predetermined dimming ratio (70%) in the range of the on-duration associated with the first interval (the first dimming range).

The third interval is defined as an interval in which the dimming ratio is not less than 10% but is less than 20%. The third interval serves as the first dimming range associated with the second control mode. In the third interval, the switching frequency is fixed to a frequency f4, and the on-duration is selected from a range of t4 to t4' (t4<t4') in accordance with the dimming ratio. Besides, t4 represents duration corresponding to a minimum value of the dimming ratio included in the third interval, and t4' represents duration corresponding to a maximum value of the dimming ratio included in the third interval. As mentioned in the above, the frequency f4 and the range of the on-duration of t4 to t4' are allocated to the third interval.

Herein, the second interval (the second dimming range) is defined as a range having a lower limit not less than a predetermined dimming ratio (20%). The third interval (the first dimming range) is defined as a range having an upper limit less than the predetermined dimming ratio (20%). The range of the on-duration associated with the third interval (the first dimming range) has the upper limit t4' not greater than the duration t3 associated with the second interval (the second dimming range). The frequency f4 associated with the third interval (the first dimming range) is not greater than the frequency f3 associated with the predetermined dimming ratio (20%) in the range of the switching frequency associated with the second interval (the second dimming range).

Defined as an interval in which the dimming ratio is not less than 95% but less than 100% is a full lighting interval. Therefore, in the full lighting interval, the control circuit 4 controls the switching element 162 at the standard frequency f1 and the standard on-duration t1.

Defined as an interval in which the dimming ratio is not less than 0% but less than 10% is a minimum dimming interval or an extinction interval. In the minimum dimming interval, the control circuit 4 controls the switching element 162 at the frequency f4 and the on-duration t4 corresponding to the minimum value (10%) of the dimming ratio included in the third interval. In the extinction interval, the control circuit 4 keeps turning off the switching element 162 so as not to supply a direct current from the switching regulator 16 to the DC light source 3.

The first dimming state mentioned herein is a lighting state according to the second control mode. Especially, the first dimming state is a lighting state observed when the dimming ratio is decreased from the 95% down to 70%. In other words, the first dimming state is a lighting state in which the dimming ratio is 70%.

The second dimming state is a lighting state in which the third control mode is additionally selected from the first dimming state. Especially, the second dimming state is a lighting state observed when the dimming ratio is decreased from the 70% down to 20%. In other words, the second dimming state is a lighting state in which the dimming ratio is 20%.

Further, the third dimming state is a lighting state in which the second control mode is additionally selected from the second dimming state. Especially, the third dimming state is a lighting state observed when the dimming ratio is decreased from the 20% down to 10%. In other words, the third dimming state is a lighting state in which the dimming ratio is 10%.

That is, when the second control mode is selected at the full lighting state, the lighting state of the lighting apparatus 1 is changed to the first dimming state. When the third control mode is selected at the first dimming state, the lighting state of the lighting apparatus 1 is changed to the second dimming state. When the second control mode is selected at the second dimming state, the lighting state of the lighting apparatus 1 is changed to the third dimming state.

In other words, the first dimming state is a state in which only the second control mode is selected at the full lighting state. The second dimming state is corresponding to a state observed when the multiple control modes are selected in a stepwise manner, that is, the second control mode and the third control mode are selected in this order at the full lighting state. The third dimming state is corresponding to a state observed when the multiple control modes are selected in a stepwise manner, that is, the second control mode, the third control mode, and the second control mode are selected in this order at the full lighting state.

In the above example, the second control mode is allocated to the first interval and the third interval, and the third control mode is allocated to the second interval. Alternatively, the third control mode may be allocated to the first interval and the third interval, and the second control mode may be allocated to the second interval. In other words, in a process of decreasing the dimming ratio from 100%, the third control mode may be performed prior to the second control mode after the first control mode is performed.

FIG. 2 shows an operation of the lighting apparatus 1 in the full lighting state. In FIG. 2, a horizontal axis of each of (a) and (b) represents time, and (a) shows a current I1 flowing through the inductor 163, and (b) shows the gate signal (driving signal) applied to the gate terminal of the switching element 162 from the control circuit 4 (FIGS. 3 to 5 are made in the same manner as FIG. 2).

Figure 3:
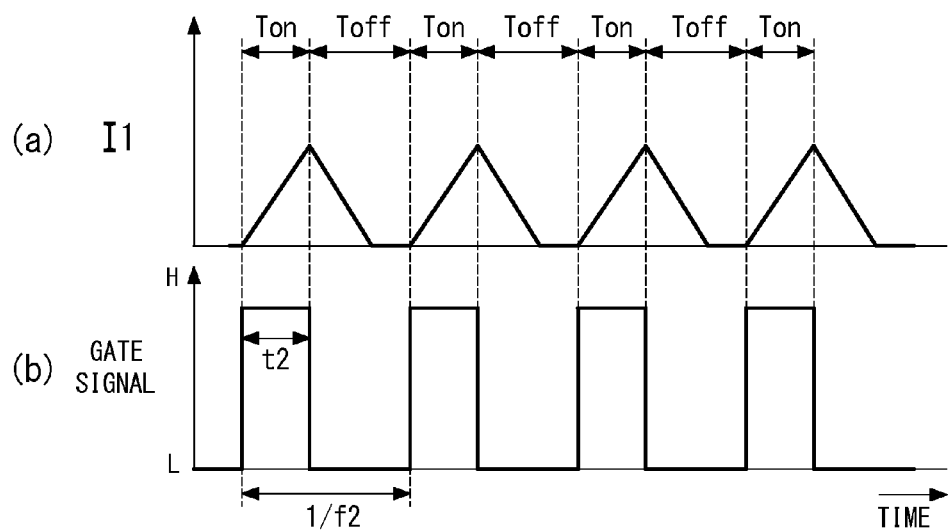
FIG. 3 is an explanation diagram illustrating the operation of the lighting apparatus in the first dimming state according to the first embodiment.
Figure 4:
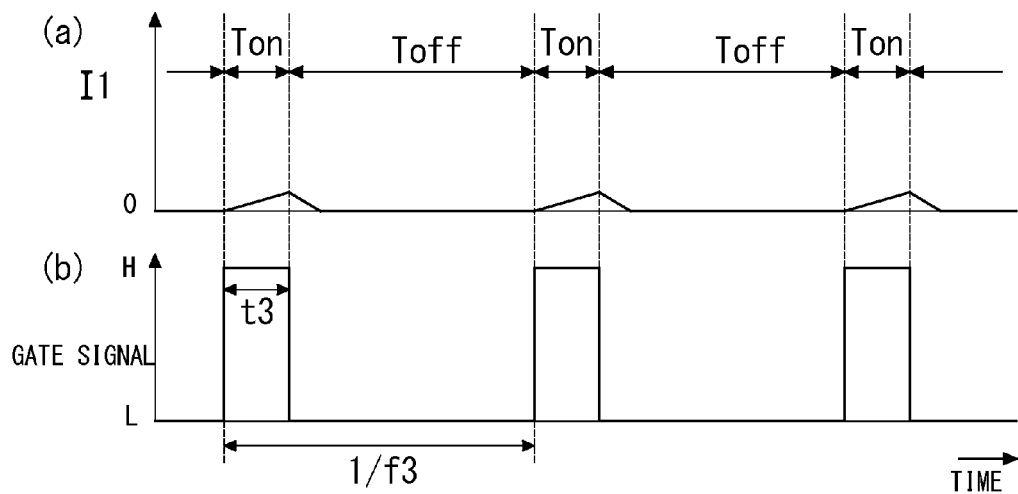
FIG. 4 is an explanation diagram illustrating the operation of the lighting apparatus in the second dimming state according to the first embodiment.
Figure 5:
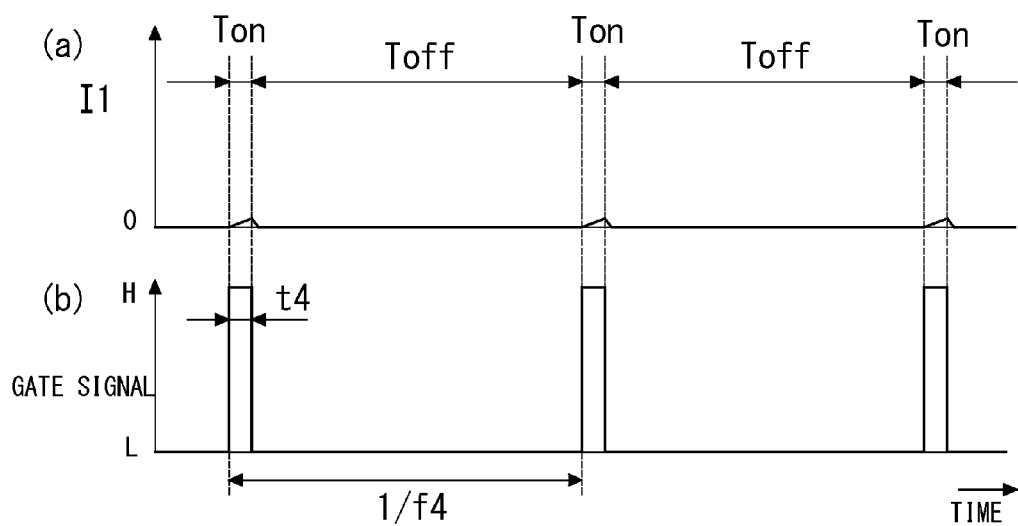
FIG. 5 is an explanation diagram illustrating the operation of the lighting apparatus in the third dimming state according to the first embodiment.

Further, in FIG. 2, an on-interval (that is, a period [on-period] in which the gate signal has the H level) in which the switching element 162 is kept turned on is represented by "Ton", and an off-interval (that is, a period [off-period] in which the gate signal has the L level) in which the switching element 162 is kept turned off is represented by "Toff" (FIGS. 3 to 5 are made in the same manner as FIG. 2).

With regard to the full lighting state, in the on-interval of the switching element 162, a current flows from the DC power supply circuit 15 through a closed circuit of the DC power supply circuit 15, the light source load 3, the inductor 163, the switching element 162, and the DC power supply circuit 15, and thus electromagnetic energy is stored in the inductor 163.

Meanwhile, in the off-interval of the switching element 162, the electromagnetic energy stored in the inductor 163 is discharged, and thus a current flows through a closed circuit of the inductor 163, the diode 161, the light source load 3, and the inductor 163.

Here, in the full lighting state, the control circuit 4 turns the switching element 162 on and off at the predetermined oscillating frequency and on-duration (on-duration per one period) according to the first control mode.

As shown in FIG. 2 (a), in the full lighting state, the lighting apparatus 1 is operated in a so-called critical mode or discontinuous mode in which the switching element 162 is turned on after the current I1 flowing through the inductor 163 becomes zero. In this case, the oscillating frequency of the switching element 162 is f1 and the on-duration thereof is t1. In brief, in the present embodiment, the standard frequency is f1, and the standard on-duration is t1.

FIG. 3 illustrates the operation of the lighting apparatus 1 in the first dimming mode.

In the first dimming state, the control circuit 4 mainly controls the on-duration of the switching element 162 so that the oscillating frequency f2 is approximately equal to the oscillating frequency f1 of the full lighting state. That is, the control circuit 4 changes only the on-duration of the switching element 162 so as to shorten the same while making the oscillating frequency of the switching element 162 identical to that in the full lighting state.

Here, as shown in FIG. 3 (a), even in the first dimming state, the lighting apparatus 1 is operated in a so-called discontinuous mode in which the switching element 162 is turned on after the current I1 flowing through the inductor 163 becomes zero.

As such, when the lighting apparatus 1 is in the first dimming state, since the on-duration of the switching element 162 is shorter than that of the full lighting state, a peak of the current I1 flowing through the inductor 163 is reduced and the electromagnetic energy stored in the inductor 163 is also reduced, as compared to the full lighting state. As a result, when compared with the full lighting state, the current (the output current) supplied from the lighting apparatus 1 to the light source load 3 is reduced and the light output from the light source load 3 is reduced (the light source load 3 becomes dark).

In this case, the on-duration t2 of the switching element 162 is shorter than the on-duration t1 in the full lighting state (t1>t2) and the oscillating frequency f2 is approximately the same as the oscillating frequency f1 in the full lighting state (f1≈f2).

FIG. 4 shows an operation of the lighting apparatus 1 in the second dimming state.

In the second dimming state, the control circuit 4 mainly controls the oscillating frequency of the switching element 162 and makes the on-duration t3 approximately identical to the on-duration t2 of the first dimming state. That is, the control circuit 4 changes only the oscillating frequency of the switching element 162 so as to reduce the same while making the on-duration of the switching element 162 identical to that in the first dimming state.

Here, as shown in FIG. 4 (a), even in the second dimming state, the lighting apparatus 1 is operated in the discontinuous mode in which the current I1 intermittently flows through the inductor 163.

As such, when the lighting apparatus 1 is in the second dimming state, the oscillating frequency of the switching element 162 is reduced and the off-duration (the off-duration per one period) of the switching element 162 is increased. Therefore, when the lighting apparatus 1 is in the second dimming state, the peak of the current I1 flowing through the inductor 163 is reduced more and the electromagnetic energy stored in the inductor 163 is also reduced more, as compared to the first dimming state. As a result, when compared with the first dimming state, the current (the output current) supplied from the lighting apparatus 1 to the light source load 3 is reduced more and the light output from the light source load 3 is reduced more (the light source load 3 becomes darker).

In this case, the on-duration t3 of the switching element 162 is approximately the same as the on-duration t2 in the first dimming state (t2≈t3) and the oscillating frequency f3 is lower than the oscillating frequency f2 in the first dimming state (f2>f3).

FIG. 5 shows an operation of the lighting apparatus 1 in the third dimming state.

In the third dimming state, the control circuit 4 mainly controls the on-duration of the switching element 162 and makes the oscillating frequency f4 approximately equivalent to the oscillating frequency f3 in the second dimming state. That is, the control circuit 4 changes only the on-duration of the switching element 162 so as to shorten the same while making the oscillating frequency of the switching element 162 identical to that in the second dimming state.

As such, when the lighting apparatus 1 is in the third dimming state, since the on-duration of the switching element 162 is shorter than that in the second dimming state, the peak of the current I1 flowing through the inductor 163 is reduced more and the electromagnetic energy stored in the inductor 163 is also reduced more, as compared to the second dimming state. As a result, when compared with the second dimming state, the current (the output current) supplied from the lighting apparatus 1 to the light source load 3 is reduced more and the light output from the light source load 3 is reduced more (the light source load 3 becomes darker).

In this case, the on-duration t4 of the switching element 162 is shorter than the on-duration t3 in the second dimming state (t3>t4) and the oscillating frequency f4 is approximately the same as the oscillating frequency f3 in the second dimming state (f3≈f4).

Consequently, the light source load 3 is brightest in the full lighting state and is darkest in the third dimming state.

The present embodiment illustrates the instance in which the control circuit 4 continuously changes the on-duration of the switching element 162 in the second control mode and continuously changes the oscillating frequency of the switching element 162 in the third control mode. However, the present embodiment is not limited to this instance. For example, the control circuit 4 may change the on-duration of the switching element 162 stepwise (discontinuously) in the second control mode and may change the oscillating frequency of the switching element 162 stepwise (discontinuously) in the third control mode.

Next, a detailed configuration of the control circuit 4 will be described in more detail.

In the present embodiment, the control circuit 4 includes a driver circuit 4a for controlling the switching element 162. As shown in FIG. 6, the driver circuit 4a is constituted by an integrated circuit (IC) 40 for control and peripheral components thereof.

As the integrated circuit 40, "L6562" from ST Micro Electronic Co. is used herein. The integrated circuit (L6562) 40 is an original IC for controlling a PFC circuit (step-up chopper circuit for power factor improving control) and includes components unnecessary to control the step-down chopper circuit 16 therein, such as a multiplying circuit. On the other hand, the integrated circuit 40 includes a function of controlling a peak value of an input current and a function of controlling zero cross within one chip in order to control so that the average value of the input current becomes a similar figure to an envelope of an input voltage, and uses these functions for controlling the step-down chopper circuit 16.

The lighting apparatus 1 includes a control power supply circuit 7. The control power supply circuit 7 includes a zener diode 701 and a smoothing capacitor 702. The control supply circuit 7 is configured to supply control power to the integrated circuit 40. The lighting apparatus 1 applies an output voltage of the control power supply circuit 7 to a power supply terminal (an eighth pin P8) of the integrated circuit 40.

Figure 7:
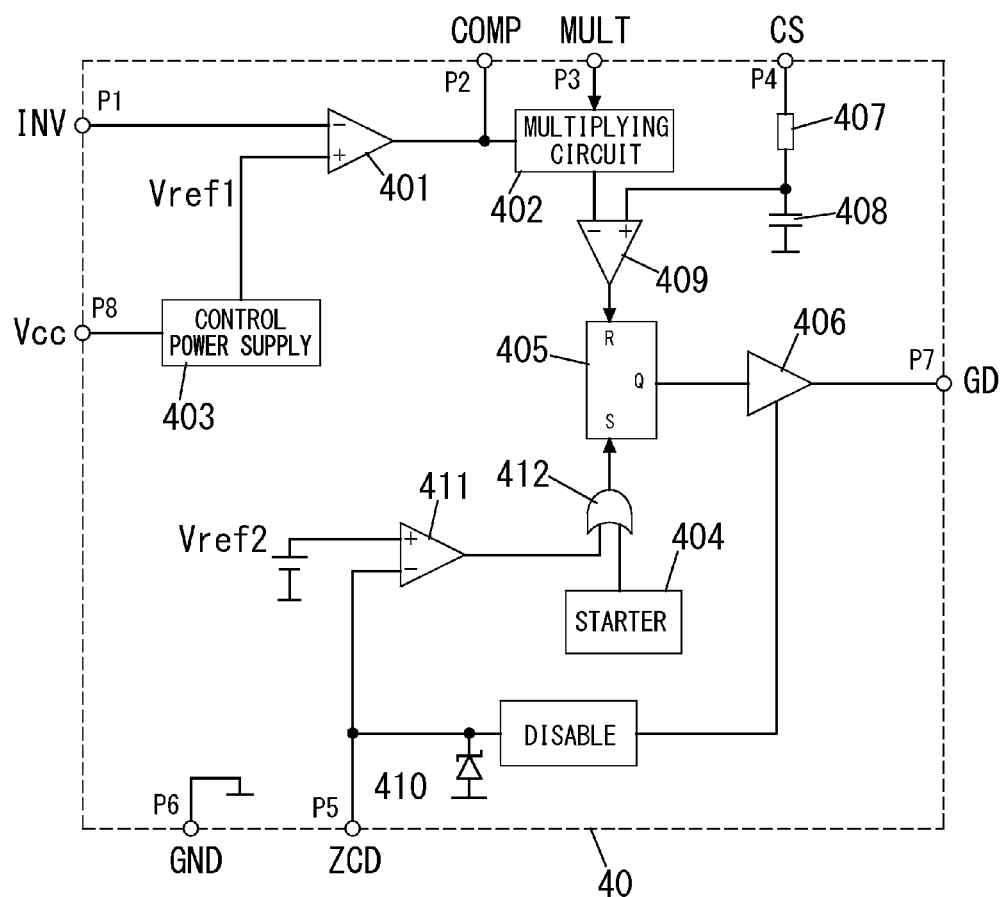
FIG. 7 is a circuit diagram illustrating the configuration of the control circuit of the lighting apparatus according to the first embodiment.

FIG. 7 schematically shows an internal configuration of the integrated circuit 40 used in the present embodiment. The integrated circuit 40 has first to eighth pins P1 to P8. The first Pin (INV) P1 is an inverting input terminal of a built-in error amplifier 401 of the integrated circuit 40. The second pin (COMP) P2 is an output terminal of the error amplifier 401. The third pin (MULT) P3 is an input terminal of a multiplying circuit 402. The fourth Pin (CS) P4 is a chopper current detection terminal. The fifth pin (ZCD) P5 is a zero cross detection terminal. The sixth pin (GND) P6 is a ground terminal. The seventh pin (GD) P7 is a gate drive terminal. The eighth pin (Vcc) P8 is the power supply terminal.

When control power supply voltage which is not less than a predetermined voltage is applied between the eighth and sixth pins P8 and P6, reference voltages Vref1 and Vref2 are generated with a control power supply 403, and thus each circuit in the integrated circuit 40 can be operated. When the integrated circuit 40 is energized, a starter 404 provides a start pulse to a set input terminal (designated by the reference character "S" in FIG. 7) of a flip flop 405, and an output terminal (designated by the reference character "Q" in FIG. 7) of the flip flop 405 has the H level accordingly, and thus a driving circuit 406 sets the seventh pin P7 to the H level.

When the seventh pin P7 is set to the H level, a drive voltage (the gate signal) obtained through voltage dividing by the resistors 41 and 42 shown in FIG. 6 is applied between the gate and the source of the switching element 162. Inserted between a source terminal of the switching element 162 and the negative electrode of the DC power supply circuit 15 is a resistor 43. The resistor 43 is used for measuring a current flowing through the switching element 162 and has a relatively low resistance. Therefore, the resistor 43 hardly affects the driving voltage between the gate and the source.

When the switching element 162 is supplied with the drive voltage and then turned on, a current flows from a positive electrode of the smoothing capacitor 152 to a negative electrode of the smoothing capacitor 152 through the light source load 3, the inductor 163, the switching element 162, and the resistor 43. In this situation, a chopper current flowing through the inductor 163 is an approximately linearly increasing current unless the inductor 163 is magnetic-saturated. Such a chopper current is measured by means of the resistor 43 serving as a current sensing unit. Connected between the opposite ends of the resistor 43 for current sensing is a series circuit of a resistor 44 and a capacitor 62. Connected to the fourth pin P4 of the integrated circuit 40 is a connection point of the resistor 44 and the capacitor 62. Therefore, the integrated circuit 40 receives at the fourth pin P4 a voltage corresponding to a value of the current measured by means of the resistor 43.

The voltage supplied to the fourth pin P4 of the integrated circuit 40 is applied to a "+" input terminal of a comparator 409 through a noise filter including a resistor 407 and a capacitor 408 therein. The comparator 409 has a "−" input terminal receiving a reference voltage determined by a voltage applied to the first pin P1 and a voltage applied to the third pin P3, and provides its output to a reset terminal (designated by the reference character "R" in FIG. 7) of the flip flop 405. In the aforementioned noise filter, the resistor 407 is, for example, 40 kΩ and the capacitor 408 is, for example, 5 pF.

Therefore, when the voltage at the fourth pin P4 of the integrated circuit 40 exceeds the reference voltage, the output of the comparator 409 becomes the H level and the reset signal is supplied to the reset terminal of the flip flop 405, and thus the output of the flip flop 405 becomes the L level. In this situation, the seventh pin P7 of the integrated circuit 40 becomes the L level, and therefore the diode 45 shown in FIG. 6 is turned on. Thus, electric charges between the gate and the source of the switching element 162 are extracted through a resistor 46, and thereby the switching element 162 is quickly turned off. When the switching element 162 is turned off, the electromagnetic energy stored in the inductor 163 is discharged to the light source load 3 through the diode 161.

In the present embodiment, resistors 47, 48, and 49 and capacitors 50 and 51 average a rectangular wave signal S1 from a signal generation circuit 21 (see FIG. 8) to be described below and a voltage having a size according to a duty ratio of the rectangular wave signal S1 is applied to the third pin P3. Therefore, the reference voltage across the comparator 409 is changed according to the duty ratio of the rectangular wave signal S1. Here, the reference voltage is increased with an increase in the duty ratio of the rectangular wave signal S1 (an increase in the time of the H level). Therefore, the on-duration of the switching element 162 is also increased. Meanwhile, since the reference voltage is decreased with a decrease in the duty ratio of the rectangular wave signal S1 (a decrease in the time of the H level), the on-duration of the switching element 162 is also decreased.

In other words, the control circuit 4 turns the switching element 162 off when a value of the current (driving current) measured through the resistor (the current sensing unit) 43 reaches a first predetermined value (corresponding to the reference voltage) determined by the rectangular wave signal S1. The on-duration of the switching element 162 is changed in accordance with a change in the first value. Therefore, in the first dimming state and the third dimming state of the present embodiment, to change the on-duration of the switching element 162, this principle is used.

In the present embodiment, the control circuit 4 is configured to measure the driving current flowing from the control circuit 4 to the switching element 162 while the driving signal is outputted. The control circuit 4 is configured to, when the driving current rises to the first predetermined value (reference voltage), switch the driving signal from the on-period to the off-period. The control circuit 4 is configured to adjust the on-duration by means of adjusting the first predetermined value.

As shown in FIG. 6, the off-duration of the switching element 162 is determined by a diode 52, a parallel circuit of a resistor 53 and a capacitor 54, a capacitor 55, a transistor 56, and a resistor 57. The diode 52 and the parallel circuit of the resistor 53 and the capacitor 54 constitute a series circuit connected between the seventh pin P7 and the fifth pin P5 of the integrated circuit 40. The capacitor 55 is connected between the fifth pin P5 and ground. The transistor 56 and the resistor 57 are connected in series with each other to form a series circuit connected in parallel with the capacitor 55. Here, resistors 58, 59, and 60 and a capacitor 61 average a rectangular wave signal S2 from the signal generation circuit 21 (see FIG. 8) to be described below. Applied between a base and an emitter of the transistor 56 is a voltage having a size according to the duty ratio of the rectangular wave signal S2.

The integrated circuit 40 includes a built-in clamp circuit 410 connected to the fifth pin P5 as shown in FIG. 7. The clamp circuit 410 clamps a voltage at the fifth pin P5 to a maximum level of, e.g., 5.7 V. Since the fifth pin P5 is connected to a "−" input terminal of a comparator 411, the comparator 411 provides an output of the H level when an input voltage to the fifth pin P5 is not less than a reference voltage Vref2 (herein, 0.7 V). Therefore, when the seventh pin P7 becomes the H level (generally about 10 to 15 V), the voltage of the fifth pin P5 is clamped to 5.7 V. However, when the seventh pin P7 becomes the L level, the diode 52 is turned off and the capacitor 55 is discharged down to 0.7 V through the transistor 56 and the resistor 57.

At this time, the output of the comparator 411 becomes the H level. Therefore, the flip flop 405 connected to the output terminal of the comparator 411 through an OR circuit 412 is set and the output of the flip flop 405 also becomes the H level. Therefore, the seventh pin P7 has the voltage of the H level again, and thus the switching element 162 is turned on. Thereafter, the control circuit 4 repeatedly performs the same operations, and thus the switching element 162 is turned on and off at a high frequency.

Here, as the duty ratio of the rectangular wave signal S2 is larger (as the time of the H level is longer), the voltage between a base and an emitter of the transistor 56 is more increased and a current flowing through the transistor 56 is also more increased. Therefore, the capacitor 55 is quickly discharged. As a result, the off-duration of the switching element 162 is decreased and the oscillating frequency of the switching element 162 is increased.

On the other hand, as the duty ratio of the rectangular wave signal S2 is smaller (as the time of the H level is shorter), the voltage between the base and the emitter of the transistor 56 is more reduced and the current flowing through the transistor 56 is also more reduced. Accordingly, the discharge of the capacitor 55 is delayed. As a result, the off-duration of the switching element 162 is increased and the oscillating frequency of the switching element 162 is decreased.

In other words, the control circuit 4 turns the switching element 162 on when a value of the voltage across the capacitor 55 charged by the driving signal of the switching element 162 is not greater than a predetermined threshold value (a value of the reference voltage Vref2). Here, the control circuit 4 determines a discharging speed of a capacitor 55 based on a second predetermined value (the voltage between the base and the emitter of the transistor 56) determined by the rectangular wave signal S2. A change in the second predetermined value causes a change in the oscillating frequency of the switching element 162. Therefore, in the second dimming state of the present embodiment, to change the oscillating frequency of the switching element 162, this principle is utilized.

In the present embodiment, the control circuit 4 includes: the capacitor 55 charged with the driving signal; and a discharging speed circuit (the transistor 56) configured to determine the discharging speed of the capacitor 55 in accordance with the second predetermined value (the voltage between the base and the emitter of the transistor 56). The control circuit 4 is configured to, when the voltage across the capacitor 55 decreases down to the predetermined threshold (the reference voltage Vref2), switch the driving signal from the off-period to the on-period. The control circuit 4 is configured to adjust the frequency of the driving signal by means of adjusting the second predetermined value.

Figure 8:
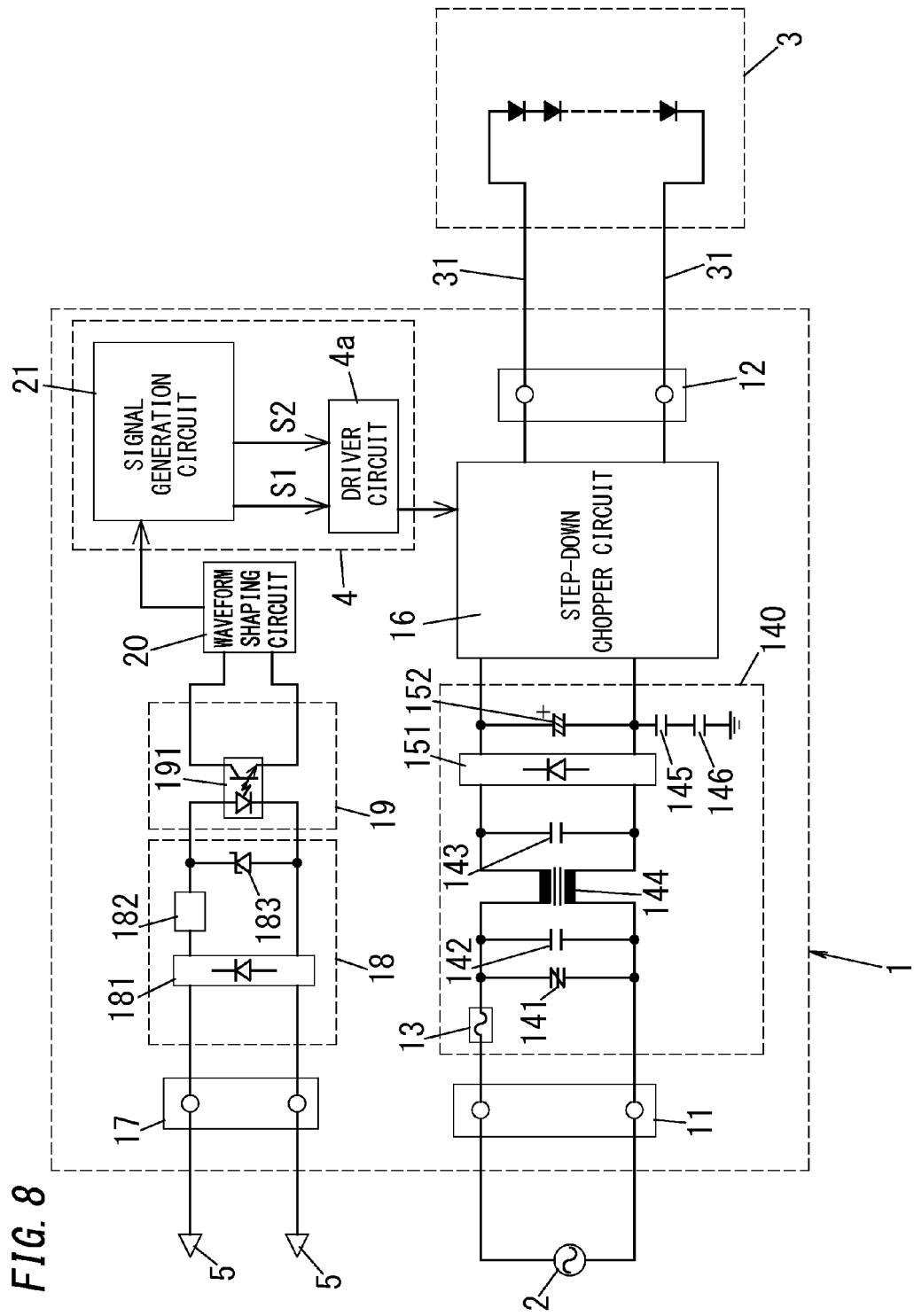
FIG. 8 is a circuit diagram illustrating the configuration of the lighting apparatus according to the first embodiment.

Next, the overall configuration of the lighting apparatus 1 in which the lighting apparatus 1 shown in FIG. 1 or 6 is added with a component receiving the dimming signal for determining the dimming ratio to generate the rectangular wave signals S1 and S2 will be described with reference to FIG. 8. In FIG. 8, the aforementioned filter circuit 14 and the DC power supply circuit 15 are combined and shown as a DC power supply generation unit 140. The DC power supply generation unit 140 includes capacitors 145 and 146 connecting a circuit ground (the negative electrode of the capacitor 152) to a frame ground in high frequency.

In FIG. 8, the lighting apparatus 1 includes a signal line connector 17 used for connecting a set of dimming signal lines 5 to the lighting apparatus 1, a rectifying circuit 18, an insulating circuit 19, and a waveform shaping circuit 20, and the signal generating circuit 21, in addition to the components shown in FIG. 1 or 6.

The set of the dimming signal lines 5 is supplied with the dimming signal including a rectangular wave voltage signal, wherein the duty ratio of the rectangular wave voltage signal is variable, and the frequency and amplitude of the rectangular wave voltage signal are, for example, 1 kHz and 10 V, respectively.

The rectifying circuit 18 is connected to the signal line connector 17. The rectifying circuit 18 is a circuit for enabling the connection of the dimming signal lines 5 to the lighting apparatus 1 irrespective of polarity of the set of the dimming signal lines 5. The lighting apparatus 1 includes the rectifying circuit 18, and thus is normally operated even when the set of the dimming signal lines 5 is connected thereto in reversed polarity. Specifically, the rectifying circuit 18 includes: a full-wave rectifier 181 connected to the signal line connector 17; an impedance element 182, and a zener diode 183. The impedance element is, for example, a resistor. The impedance element 182 and the zener diode 183 are connected in series with an output of the full-wave rectifier 181. Therefore, the rectifying circuit 18 full-wave rectifies the input dimming signal with the full-wave rectifier 181 and generates the rectangular wave voltage signal across the zener diode 183 through the impedance element 182.

The insulating circuit 19 includes a photocoupler 191. The insulating circuit 19 is configured to transfer the rectangular wave voltage signal to the control circuit 4 while electrically insulating the dimming signal lines 5 from the control circuit 4 of the lighting apparatus 1.

The waveform shaping circuit 20 is configured to correct a waveform of a signal output from the photocoupler 191 of the insulating circuit 19 and output the resultant signal as a pulse width modulation (PWM) signal. Therefore, even when the waveform of the rectangular wave voltage signal (the dimming signal) transmitted far through the dimming signal lines 5 is distorted, the waveform shaping circuit 20 can remove the influence of the distortion.

Here, in a conventional inverter-type fluorescent lamp dimming ballast, a low pass filter circuit such as a CR integrating circuit (a smoothing circuit) is mounted at a latter stage of the waveform shaping circuit. The ballast is adapted to generate an analog dimming voltage and variably control a frequency of the inverter, and the like, according to the dimming voltage. In contrast, the lighting apparatus 1 according to the present embodiment is adapted to supply to the signal generation circuit 21 the PWM signal which is the signal subjected to the waveform shaping.

The signal generation circuit 21 constitutes the control circuit 4 in combination with the driver circuit 4a. The signal generation circuit 21 includes a microcomputer and peripheral components thereof, which are not shown.

The microcomputer is configured to measure an on-period of the input PWM signal through a built-in timer and supply two kinds of rectangular wave signals S1 and S2 to the driver circuit 4a. The rectangular wave signals S1 and S2 supplied from the microcomputer are smoothed through the resistor and the capacitor within the driver circuit 4a, as described above. Therefore, as the duty ratio of the rectangular wave signal S1 is larger (as the time of the H level is longer), the input value in the driver circuit 4a is more increased. That is, as the duty ratio of the rectangular wave signal S1 is larger, the voltage V1 of the third pin P3 supplied with the smoothed rectangular wave signal S1 is more increased. As the duty ratio of the rectangular wave signal S2 is larger, the voltage V2 between the base and the emitter of the transistor 56, supplied with the smoothed rectangular wave signal S2 is more increased.

Figure 9:
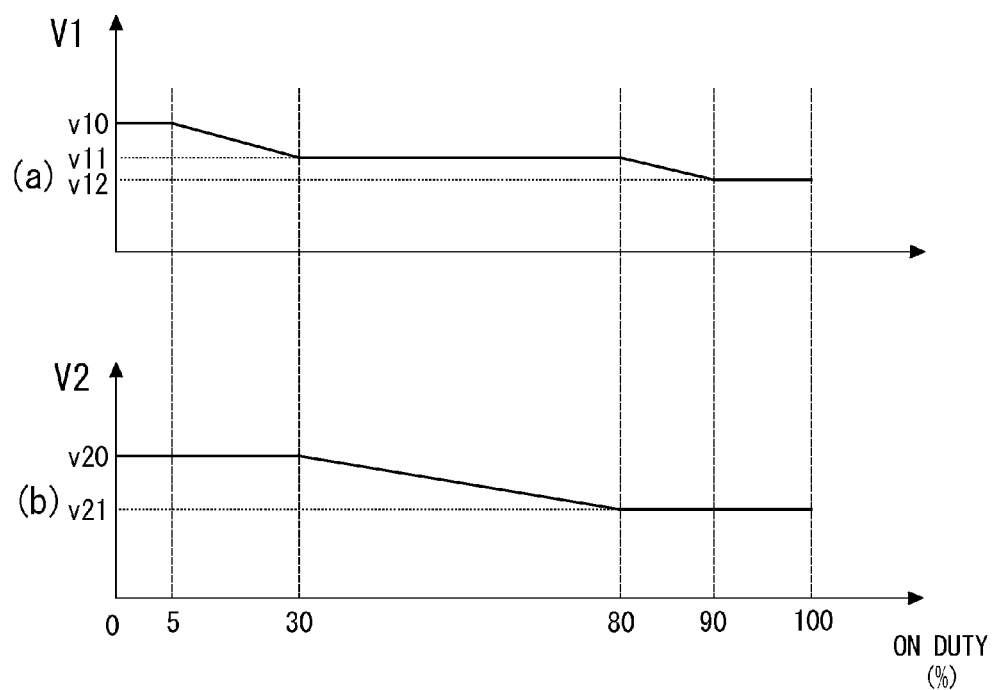
FIG. 9 is an explanation diagram illustrating the operation of the lighting apparatus according to the first embodiment.

Next, an explanation referring to FIG. 9 is made to an operation of the lighting apparatus in response to a change in the PWM signal.

With regard to FIG. 9, horizontal axes represent the duty ratio (On duty) of the PWM signal, and (a) shows the voltage V1 applied to the third pin P3 of the integrated circuit 40 of the control circuit 4, and (b) shows the voltage V2 between the base and the emitter of the transistor 56. The duty ratio of the PWM signal corresponds to the duty ratio of the dimming signal since, for the PWM signal, the dimming signal is subjected to only the rectifying or the waveform shaping.

As shown in FIG. 9, in the interval (full lighting interval) in which the duty ratio of the PWM signal is in a range of 0 to 5%, the voltage V1 of the third pin P3 and the voltage V2 between the base and the emitter of the transistor 56 are set as initial values (V1=v10, V2=v20), respectively. In brief, the first control mode is associated with the interval in which the duty ration of the PWM signal is in the range of 0 to 5%. Therefore, in this interval (full lighting interval), the lighting apparatus 1 is in the full lighting state. Consequently, the oscillating frequency and the on-duration of the switching element 162 of the step-down chopper circuit 16 are adjusted to f1 and t1, respectively.

The second control mode is allocated for the interval (first interval) in which the duty ratio of the PWM signal is in a range of 5 to 30%. In this interval (first interval), the signal generation circuit 21 reduces the duty ratio of the rectangular wave signal S1 according to an increase in the duty ratio of the PWM signal to reduce the voltage V1 of the third pin P3 down to v11 (<v10). Since the on-duration of the switching element 162 is decreased with a decrease in the voltage V1, the load current (the output current supplied to the light source load 3) is also reduced. In this situation, in order to substantially and constantly maintain the oscillating frequency of the switching element 162, the signal generation circuit 21 may slightly reduce the duty ratio of the rectangular wave signal S2 to slightly reduce the voltage V2 and delay the discharge of the capacitor 55 to slightly increase the off-duration of the switching element 162. This state is corresponding to the first dimming state.

The third control mode is allocated for the interval (second interval) in which the duty ratio of the PWM signal is in a range of 30 to 80%. In this interval (second interval), the signal generation circuit 21 reduces the duty ratio of the rectangular wave signal S2 according to an increase in the duty ratio of the PWM signal, thereby reducing the voltage V2 between the base and the emitter down to v21 (<v20). A decrease in the voltage V2 causes a decrease in a drawn current of the transistor 56 and discharging time of the capacitor 55 is increased. Therefore, the off-duration of the switching element 162 is increased and the oscillating frequency is reduced. Consequently, the load current is reduced. In this situation, the voltage V1 of the third pin P3 is kept equivalent to v11, and therefore the on-duration of the switching element 162 is constant. This state is corresponding to the second dimming state.

The second control mode is allocated for the interval (third interval) in which the duty ratio of the PWM signal is in a range of 80 to 90%. In this interval (third interval), the signal generation circuit 21 reduces the duty ratio of the rectangular wave signal S1 according to an increase in the duty ratio of the PWM signal, reducing the voltage V1 of the third pin P3 down to v12 (<v11). When the voltage V1 is reduced, the on-duration of the switching element 162 is shorter, and thus the load current is reduced more. In this situation, in order to substantially and constantly maintain the oscillating frequency of the switching element 162, the signal generation circuit 21 may slightly reduce the duty ratio of the rectangular wave signal S2 to slightly reduce the voltage V2 and delay the discharge of the capacitor 55 to slightly increase the off-duration of the switching element 162. This state is corresponding to the third dimming state.

In the interval in which the duty ratio of the PWM signal is in a range of 90 to 100%, the signal generation circuit 21 is designed to constantly maintain the duty ratios of the rectangular wave signals S1 and S2, thereby maintaining the third dimming state. Alternatively, in the interval in which the duty ratio of the PWM signal is in a range of 90% to 100%, the lighting apparatus 1 may set at least one of the voltage V1 of the third pin P3 and the voltage V2 between the base and the emitter to the L level to stop the operation of the step-down chopper circuit 16 and turn the light source load 3 off. That is, the control circuit 4 may set at least one of the first predetermined value (corresponding to the reference voltage) determined by the rectangular wave signal S1 and the second predetermined value (the voltage V2 between the base and the emitter) determined by the rectangular wave signal S2 to zero or less to stop the On and Off operation of the switching element 162.

The control circuit 4 sets the oscillating frequency of the switching element 162 to be 1 kHz or more, preferably, several kHz or more. In brief, a minimum of the oscillating frequency (switching frequency) is 1 kHz.

Therefore, even in the second or third dimming state in which the oscillating frequency is reduced, a flicker frequency of the light source load 3 is relatively high and the interference between the flicker of the light source load 3 and the shutter speed (the exposure time), for example, at the time of the camera photographing can be avoided.

As mentioned in the above, the lighting apparatus 1 of the present embodiment includes: the switching element 162 connected to the DC power supply in series and controlled to be turned on and off at high frequency; the inductor 163 connected to the switching element 162 in series to flow a current from the DC power supply therein while the switching element 162 is turned on; the diode 161 serving to provide electromagnetic energy accumulated in the inductor 163, while the switching element 162 is turned on, to the light source load 3 formed of a semiconductor light emitting device while the switching element 162 is turned off; and the control circuit 4 configured to control the operation of turning on and off the switching element 162. The control circuit 4 includes, as the control mode of the switching element 162, the first control mode, the second control mode, and the third control mode. In the first control mode, the control circuit 4 turns on and off the switching element 162 based on the predetermined oscillation frequency and the on-duration so as to flow a current through the inductor 161 in the critical mode or the discontinuous mode. In the second control mode, the control circuit 4 fixes the oscillation frequency of the switching element 162 and changes the on-duration of the switching element 162. In the third control mode, the control circuit 4 fixes the on-duration of the switching element 162 and changes the oscillation frequency of the switching element 162. The second control mode and the third control mode are selectively allocated for the intervals into which the range of the dimming ratio is divided. The control circuit 4 selects the first control mode to fully light the light source load 3. When the dimming ratio is designated, the control circuit 4 selects the second control mode or the third control mode in accordance with the interval corresponding to the designated dimming ratio so as to dim the light source load 3 at the designated dimming ratio.

In other words, the lighting apparatus 1 of the present embodiment includes: the switching regulator (step-down chopper circuit) 16 configured to supply a direct current to the DC light source 3; and the control circuit 4 configured to control the switching regulator 16 in order to supply a direct current having a magnitude corresponding to the dimming ratio to the DC light source 3. The switching regulator 16 includes the switching element 162. The control circuit 4 is configured to adjust the switching frequency and the on-duration of the switching element 162 in accordance with the dimming ratio. The control circuit 4 is configured to, when the dimming ratio falls within the first dimming range, adjust the switching frequency to a frequency associated with the first dimming range and adjust the on-duration to duration associated with the dimming ratio in a range of the on-duration associated with the first dimming range. The control circuit 4 is configured to, when the dimming ratio falls within the second dimming range different from the first dimming range, adjust the on-duration to duration associated with the second dimming range and adjust the switching frequency to a frequency associated with the dimming ratio in a range of the switching frequency associated with the second dimming range.

Further, in the lighting apparatus 1 of the present embodiment, the control circuit 4 is configured to, when the control circuit 4 lights the DC light source 3 at full power, adjust the switching frequency to the predetermined standard frequency and adjust the on-duration to the predetermined standard on-duration. The combination of the standard frequency and the standard on-duration is selected based on the combination of the switching frequency and the on-duration associated with luminance of the DC light source 3 used as the unit amount of the dimming ratio. Besides, this configuration is optional.

Further, in the lighting apparatus 1 of the present embodiment, the switching regulator 16 includes the inductor 163 connected in series with the switching element 162. The switching regulator 16 is configured to store energy from a power source in the inductor 163 while the switching element 162 is turned on, and to provide the energy stored in the inductor 163 to the DC light source 3 while the switching element 162 is turned off. The standard frequency and the standard on-duration are selected such that a current flows through the inductor 163 in a critical mode or a discontinuous mode. Besides, this configuration is optional.

Further, in the lighting apparatus 1 of the present embodiment, the control circuit 4 is configured to output the driving signal in accordance with the dimming ratio to the switching element 162. The driving signal is a periodic voltage signal, and has the on-period in which the driving signal has the voltage exceeding the threshold for turning on the switching element 162, and the off-period in which the driving signal has the voltage falling below the threshold. The on-duration is defined determined by the on-period of the driving signal. The switching frequency is determined by a frequency of the driving signal. Besides, this configuration is optional.

According to the lighting apparatus 1 of the present embodiment as described above, the control circuit 4 appropriately selects the second control mode for changing the on-duration of the switching element 162 and the third control mode for changing the oscillating frequency in a stepwise fashion, thereby dimming the light source load 3.

Therefore, when comparing with the instance in which the light source load 3 is dimmed based on only the second control mode or the third control mode, the lighting apparatus 1 may expand the dimming range of the light source load 3 without flickering the light source load 3. As a result, the lighting apparatus 1 can precisely (finely) control the luminance of the light source load 3 over the relatively wide range. Consequently, the lighting apparatus 1 of the present embodiment is capable of widening the dimming range of the light source load 3 with a relatively simple configuration.

In addition, the control of the dimming ratio in the dimming state is performed through the signal generation circuit 21 including the microcomputer as a main component, such that the lighting apparatus 1 that can precisely (finely) control the luminance of the light source load 3 with the relatively simple configuration can be realized.

Further, when the lighting apparatus 1 fully lights the lighting source load 3, the control circuit 4 is operated in the first control mode in which the on-duration and the oscillating frequency of the switching element 162 are fixed and the switching element 162 is turned on and off in the critical or discontinuous mode in which a current discontinuously flows through the inductor 163.

Therefore, even when the lighting apparatus 1 changes at least one of the on-duration and the oscillating frequency of the switching element 162 to dim the light source load 3, the switching element 162 is turned on and off in the critical or discontinuous mode in which a current discontinuously flows through the inductor 163. For example, the lighting apparatus 1 always turns the switching element 162 on and off in the intermittent mode (the critical mode or discontinuous mode) regardless of the dimming ratio.

In the intermittent mode, the switching element 162 is turned on at a timing when the current flowing through the inductor 163 is zero, such that the loss of the switching element 162 may be reduced more when compared with the continuous mode in which a current continuously flows through the inductor 163 without the sleep interval. That is, the switching element 162 is operated in the intermittent mode at all times, such that the lighting apparatus 1 according to the present embodiment can reduce the loss of the switching element 162 more and can realize the higher circuit efficiency, as compared with the instance in which the switching element 162 is operated in the continuous mode.

The lighting apparatus 1 further includes the current sensing unit (the resistor 43) arranged to measure the current flowing in the switching element 162 and the capacitor 55 charged by the driving signal of the switching element 162. The control circuit 4 is designed to turn off the switching element 162 when the current measured by the current sensing unit (the resistor 43) reaches the first predetermined value. The control circuit 4 is designed to turn on the switching element 162 when the voltage across the capacitor 55 is the predetermined threshold value or less. The control circuit 4 is configured to vary the first predetermined value to change the on-duration of the switching element 162. The control circuit 4 is configured to vary the second predetermined value determining the discharging speed of the capacitor 55 to change the oscillation frequency of the switching element 162.

In other words, the control circuit 4 is configured to measure the driving current flowing from the control circuit 4 to the switching element 162 while the driving signal is outputted. The control circuit 4 is configured to, when the driving current rises to the first predetermined value, switch the driving signal from the on-period to the off-period. The control circuit 4 is configured to adjust the on-duration by means of adjusting the first predetermined value. Besides, this configuration is optional.

Further, the control circuit 4 includes: the capacitor 55 charged with the driving signal; and the discharging speed circuit (the transistor 56) configured to determine the discharging speed of the capacitor 55 in accordance with the second predetermined value. The control circuit 4 is configured to, when the voltage across the capacitor 55 decreases down to the predetermined threshold, switch the driving signal from the off-period to the on-period. The control circuit 4 is configured to adjust the frequency of the driving signal by means of adjusting the second predetermined value. Besides, this configuration is optional.

Further, in the lighting apparatus 1 of the present embodiment, the control circuit 4 sets at least one of the first predetermined value and the second predetermined value to be zero or less to stop the turn-on and off operation of the switching element 162 and turn off the light source load 3.

In other words, the control circuit 4 is configured to adjust the first predetermined value to the value not greater than zero in order to turn off the DC light source 3. Alternatively, the control circuit 4 is configured to adjust the second predetermined value to the value not greater than zero in order to turn off the DC light source 3. Besides, these configurations are optional.

Further, in the lighting apparatus 1 of the present embodiment, the control circuit 4 receives externally the dimming signal to select the control mode of the switching element 162 according to the dimming ratio determined by the corresponding dimming signal. In other words, the control circuit 4 is configured to receive the dimming signal indicative of the dimming ratio. Besides, this configuration is optional.

In the present embodiment, the dimming signal supplied to the lighting apparatus 1 is the rectangular wave of which the duty ratio is variable, but it is not limited thereto. For example, the dimming signal may be a DC voltage of which the voltage value is variable. In this example, the signal generation circuit 21 including the microcomputer realizes the dimming control by controlling the duty ratios of the rectangular wave signals S1 and S2 based on the amplitude (the voltage value) of the dimming signal. The lighting apparatus 1 is not limited as a configuration that inputs the dimming signal via the dimming signal lines 5. For example, the lighting apparatus 1 may be a configuration in which an infrared light receiving module is mounted to receive the dimming signal by infrared communication.

Second Embodiment

Figure 10:
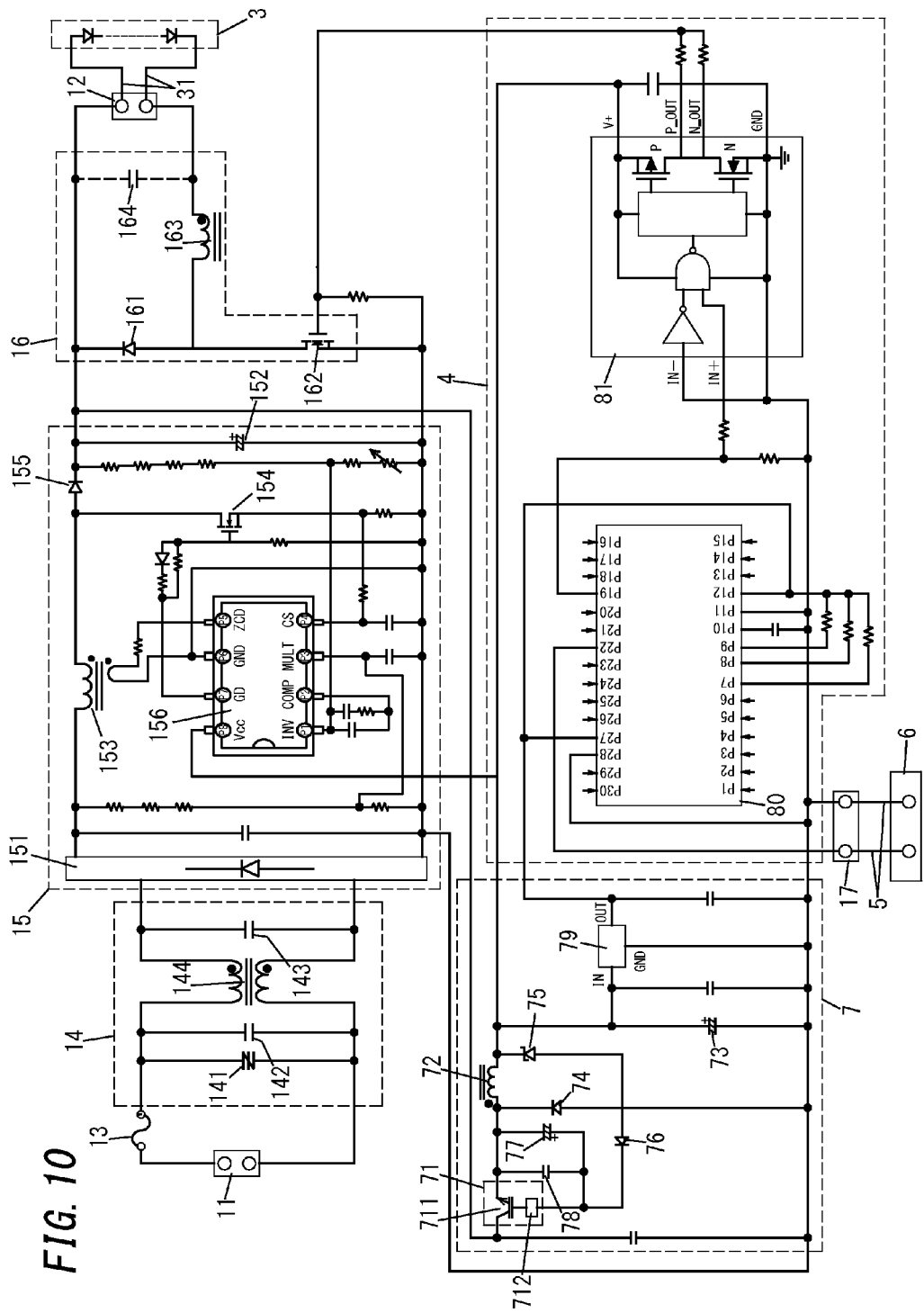
FIG. 10 is a circuit diagram illustrating the configuration of the lighting apparatus of the second embodiment.

The lighting apparatus 1 according to the present embodiment is different from the lighting apparatus 1 according to the first embodiment in terms of the configuration of the control circuit 4 and the control power supply circuit 7, as shown in FIG. 10. In the example of FIG. 10, an external dimmer 6 outputting the rectangular wave voltage signal of 5 V, 1 kHz as the dimming signal is connected to the signal line connector 17 of the lighting apparatus 1 through the dimming signal lines 5. Hereinafter, the same components as in the first embodiment are denoted by the same reference numerals and the description thereof will not be repeated here.

In the present embodiment, the DC power supply circuit 15 includes a step-up chopper circuit serving as a power factor improving circuit. The step-up chopper circuit is provided at the output terminal of the full-wave rectifier 151.

The step-up chopper circuit has a general configuration in which an inductor 153 and a switching element 154 are connected in series to each other and are between the output terminals of the full-wave rectifier 151, and a diode 155 and the smoothing capacitor 152 are connected in series to each other and connected across the switching element 154. Therefore, a DC voltage (approximately 410 V) obtained by stepping-up and smoothing the supply voltage from the AC power supply 2 is generated at the output terminal (both ends of the smoothing capacitor 152) of the DC power supply circuit 15.

The step-up chopper circuit is operated by controlling the On and Off of the switching element 154 through a control circuit that includes an integrated circuit 156 including "L6562" from ST Micro Electronic Co. and peripheral components thereof. The operation of this kind of step-up chopper circuit is known, and therefore the operation thereof will not be described here.

As shown in FIG. 10, in the present embodiment, the control power supply circuit 7 includes an IPD element 71 connected to the smoothing capacitor 152, and peripheral components thereof.

The IPD element 71 is a so-called intelligent power device and for example, "MIP2E2D" from Panasonic is used for the element. The IPD element 71, which is a three-pin integrated circuit having a drain terminal, a source terminal, and a control terminal, includes a built-in switching element 711 including a power MOSFET and a built-in controller 712 adapted to turn the switching element 711 on and off.

The control power supply circuit 7 includes a step-down chopper circuit constituted by the built-in switching element 711 in the IPD device 71, an inductor 72, a smoothing capacitor 73, and a diode 74. The control power supply circuit 7 includes a power supply circuit for the IPD element 71 constituted by a zener diode 75, a diode 76, a smoothing capacitor 77, and a capacitor 78.

According to the above configuration, the control power supply circuit 7 generates a constant voltage (for example, about 15 V) across the smoothing capacitor 73. The constant voltage is used as a power supply voltage VC1 for supplying the control power of the integrated circuit (a three-terminal regulator 79, a microcomputer 80, and a driver circuit 81) to be described below. Since the smoothing capacitor 73 is uncharged until the IPD element 71 starts operation, other integrated circuits (the three-terminal regulator 79, the microcomputer 80, and the driver circuit 81) are not activated.

Hereinafter, an operation of the control power supply circuit 7 will be described.

At the early stage of power up, when the smoothing capacitor 152 is charged by the output voltage of the full-wave rectifier 151, a current flows along a path of the drain terminal of the IPD element 71, the control terminal of the IPD element 71, the smoothing capacitor 77, the inductor 72, and the smoothing capacitor 73. Therefore, the smoothing capacitor 73 is charged with the polarity as shown in FIG. 10 and supplies an operating voltage to the IPD element 71. Therefore, the IPD element 71 is activated and turns the built-in switching element 711 on and off When the built-in switching element 711 of the IPD element 71 is turned on, a current flows along a path of the smoothing capacitor 152, the drain terminal of IPD element 71, the source terminal of IPD element 71, the inductor 72 and the smoothing capacitor 73, and thus the smoothing capacitor 73 is charged. When the switching element 711 is turned off, the electromagnetic energy stored in the inductor 72 is discharged to the smoothing capacitor 73 through the diode 74. Therefore, the circuit including the IPD element 71, the inductor 72, the diode 74, and the smoothing capacitor 73 acts as the step-down chopper circuit, such that the power supply voltage VC1 obtained by stepping down the voltage across the smoothing capacitor 152 is generated across the smoothing capacitor 73.

When the built-in switching element 711 in the IPD element 71 is turned off, the regenerative current flows through the diode 74. However, the voltage across the inductor 72 is clamped to a sum voltage of voltage across the smoothing capacitor 73 and forward voltage of the diode 74. Voltage obtained by subtracting the zener voltage of the zener diode 75 and the forward voltage of the diode 76 from the sum voltage becomes a voltage across the smoothing capacitor 77. A built-in controller 712 in the IPD element 71 is adapted to control the On and Off operation of the switching element 711 so that the voltage across the smoothing capacitor 77 is constant. As a result, the voltage (the power supply voltage VC1) across the smoothing capacitor 73 is also constant.

When the power supply voltage VC1 is generated across the smoothing capacitor 73, the three-terminal regulator 79 starts supplying the power voltage VC2 (e.g., 5 V) to the microcomputer 80 to start the On and Off control of the switching element 162 of the step-down chopper circuit 16. The microcomputer 80 is supplied with the dimming signal from the external dimmer 6 and performs the dimming control.

As shown in FIG. 10, the control circuit 4 includes the microcomputer 80 and is configured to generate the rectangular wave signal for driving the switching element 162 of the step-down chopper circuit 16 based on internal programs.

The microcomputer 80 has programs set to output the rectangular wave signal for driving the switching element 162 from a nineteenth pin P19 according to the on-time (the pulse width) of the dimming signal from the external dimmer 6 supplied to a twenty-second pin P22.

Further, the control circuit 4 includes the driver circuit 81 configured to receive the output (the rectangular wave signal) from a nineteenth pin P19 of the microcomputer 80 to actually drive the switching element 162. Therefore, the microcomputer 80 controls the switching element 162 by receiving the dimming signal from the external dimmer 6 to control the current flowing through the light source load 3, thereby realizing the dimming control.

Here, in the present embodiment, the three-terminal regulator 79 is, for example, "TA78L05" from Toshiba Co., and the microcomputer 80 is an 8-bit microcomputer "78K0/Ix2" from RENESAS Co., and the driver circuit 81 is "MAX15070A" from Maxim Co.

Besides, in the instance shown in FIG. 10, the output capacitor 164 serving to smooth a pulsation component (ripple) of the output current supplied to the light source load 3 is illustrated by dashed lines.

The lighting apparatus 1 in the present embodiment selects the lighting state from the full lighting state, the first dimming state, and the second dimming state in accordance with the duty ratio (the dimming ratio) of the dimming signal, and operates in the selected lighting state. In the full lighting state, full lighting of the light source load 3 is performed. In the first and second dimming states, the light source load 3 is dimmed.

The first dimming state mentioned herein is a lighting state based on the third control mode in which the on-duration of the switching element 162 is approximately fixed and the oscillating frequency of the switching element 162 is variable.

The second dimming state is a lighting state in which the second control mode in which the oscillating frequency of the switching element 162 is approximately fixed and the on-duration of the switching element 162 is variable, is further selected from the first dimming state.

Next, an operation of the lighting apparatus 1 according to the present embodiment will be described with reference to FIGS. 11 to 14.

Figure 11:
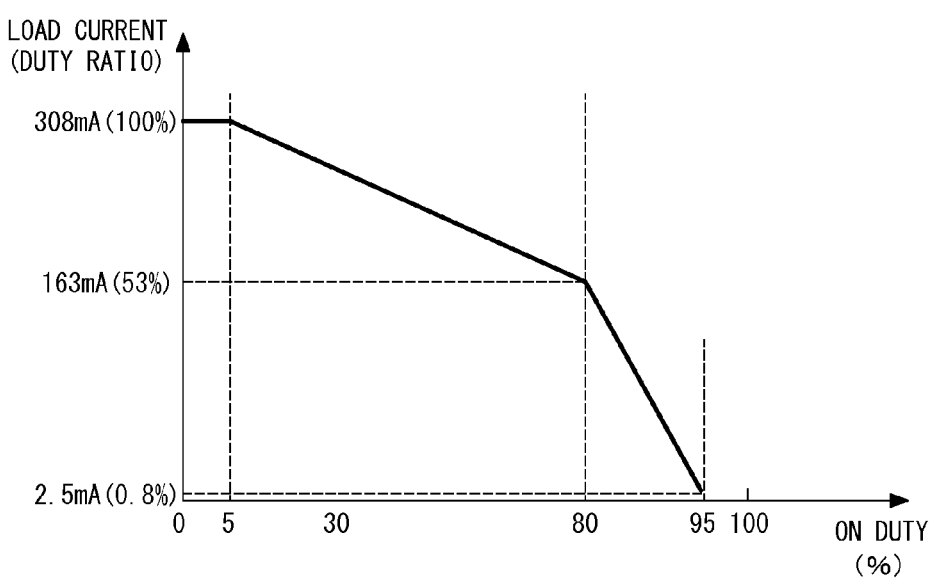
FIG. 11 is an explanation diagram illustrating the operation of the lighting apparatus according to the second embodiment.

FIG. 11 shows the dimming ratio (in parentheses in FIG. 11) when the horizontal axis represents the duty ratio (On duty) of the dimming signal (the PWM signal) from the external dimmer 6 and the vertical axis represents the load current (an effective value of the output current supplied to the light source load 3) and 308 mA is the full lighting (100%).

First, in the interval in which the duty ratio of the dimming signal is a range of 0 to 5%, the microcomputer 80 outputs the constant rectangular wave signal for driving the switching element 162 from the nineteenth pin P19.

In the present embodiment, the rectangular wave signal in this time is set so that the oscillating frequency is 30 kHz, the on-time is 5.8 μs and the voltage value is 5 V. Upon receiving this rectangular wave signal, the driver circuit 81 amplifies the voltage of the received signal to 15 V and supplies the amplified signal to the gate of the switching element 162 of the step-down chopper circuit 16 to turn the switching element 162 on and off.

In this situation, the lighting apparatus 1 is operated in the full lighting state and the output current of 308 mA in average flows through the light source load 3 (the dimming ratio of 100%). The lighting apparatus 1 continues the state (the full lighting state) until the duty ratio of the dimming signal reaches 5%.

Figure 12:
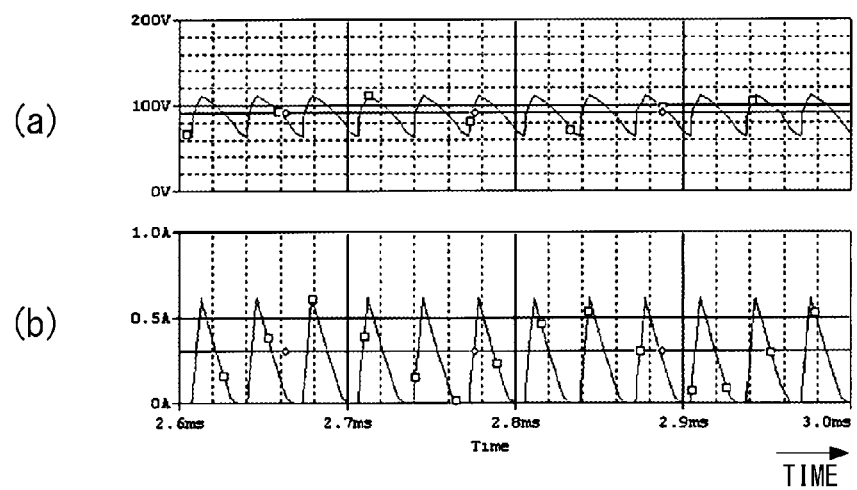
FIG. 12 is an explanation diagram illustrating the operation of the lighting apparatus according to the second embodiment.

In FIG. 12 a horizontal axis of each of (a) and (b) represents time, and (a) shows the voltage across the light source load 3 in the above state (the full lighting state), and (b) shows the current flowing through the light source load 3. As apparent from the current illustrated in FIG. 12 (b), the On and Off operation of the switching element 162 is in a discontinuous mode and the switching element 162 is turned on at the timing when the current is zero, such that the switching loss of the switching element 162 is small.

Next, the third control mode is allocated for the interval in which the duty ratio of the dimming signal is a range of 5 to 80%. In brief, the interval in which the duty ratio of the dimming signal is in the range of 5 to 80% is corresponding to the second dimming range associated with the third control mode. In this interval, the microcomputer 80 gradually reduces the oscillating frequency of the rectangular wave signal supplied from the nineteenth pin P19 according to the increase in the duty ratio of the dimming signal.

In the present embodiment, the microcomputer 80 approximately maintains the on-time of the rectangular wave signal as a predetermined value (5.8 μs) and gradually increases the off-time of the rectangular wave signal according to the increase in the duty ratio of the dimming signal. Here, the program of the microcomputer 80 is set so that, when the duty ratio of the dimming signal is 80%, the oscillating frequency of the rectangular wave signal supplied from the nineteenth pin P19 is 8 kHz.

In this situation, the lighting apparatus 1 is operated in the first dimming state and an average of the output current flowing through the light source load 3 is controlled to 163 mA (the dimming ratio of 53%) as a lower limit.

Figure 13:
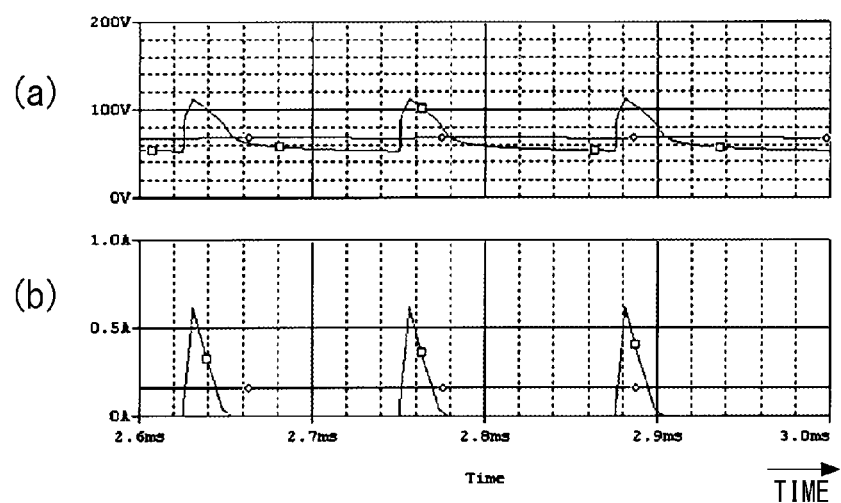
FIG. 13 is an explanation diagram illustrating the operation of the lighting apparatus according to the second embodiment.

In FIG. 13 a horizontal axis of each of (a) and (b) represents time, and (a) shows the voltage across the light source load 3 in the above state (the first dimming state), and (b) shows the current flowing through the light source load 3.

The second control mode is allocated for the interval in which the duty ratio of the dimming signal is a range of 80% or more. In brief, the interval in which the duty ratio of the dimming signal is not less than 80% is corresponding to the first dimming range associated with the second control mode. In this interval, the microcomputer 80 gradually reduces the on-time of the rectangular wave signal supplied from the nineteenth pin P19 according to the increase in the duty ratio of the dimming signal.

In the present embodiment, the microcomputer 80 changes the on-duration according to the duty ratio of the dimming signal while making the oscillating frequency approximately constant as a predetermined value (8 kHz). Here, the program of the microcomputer 80 is set so that, when the duty ratio of the dimming signal reaches 95%, the on-time of the rectangular wave signal supplied from the nineteenth pin P19 is 0.5 μs.

In this situation, the lighting apparatus 1 is operated in the second dimming state and the average of the output current flowing through the light source load 3 is controlled to 2.5 mA (the dimming ratio of 0.8%) as a lower limit.

Figure 14:
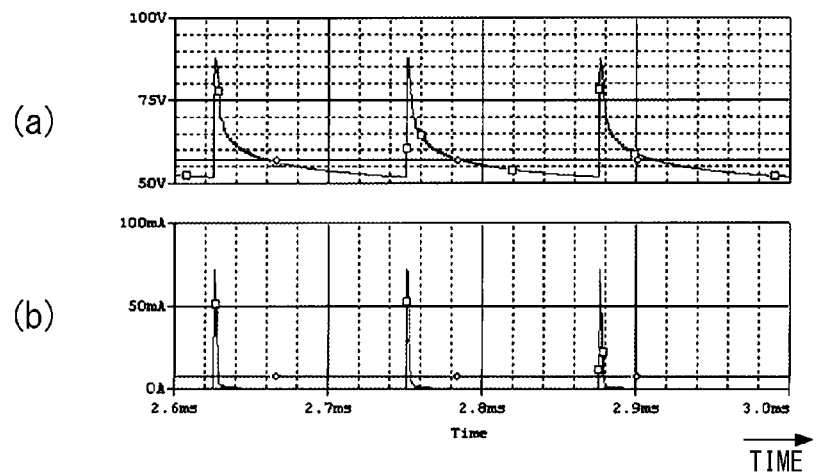
FIG. 14 is an explanation diagram illustrating the operation of the lighting apparatus according to the second embodiment.

In FIG. 14 a horizontal axis of each of (a) and (b) represents time, and (a) shows the voltage across the light source load 3 in the above state (the second dimming state), and (b) shows the current flowing through the light source load 3.

In the present embodiment, in the interval in which the duty ratio of the PWM signal is in a range of 95% or more, the lighting apparatus 1 sets the output from the nineteenth pin P19 of the microcomputer 80 to the L level to stop the operation of the step-down chopper circuit 16, thereby turning the light source load 3 off (see FIG. 11).

According to the lighting apparatus 1 of the present embodiment as described above, the control circuit 4 dims the light source load 3 by appropriately selecting the second control mode for changing the on-duration of the switching element 162 and the third control mode for changing the oscillating frequency in a stepwise manner. Therefore, when compared with the instance in which the light source load 3 is dimmed based on only the second control mode or the third control mode, the lighting apparatus 1 may expand the dimming range of the light source load 3 without flickering the light source load 3. As a result, the lighting apparatus 1 can precisely (finely) control the brightness of the light source load 3 over the relatively wide range.

In addition, the control of the dimming ratio in the dimming state is performed with the microcomputer 80 of the control circuit 4, such that the lighting apparatus 1 that can precisely (finely) control the brightness of the light source load 3 with the relatively simple configuration can be realized.

Other components and functions are the same as the first embodiment.

However, each lighting apparatus 1 described in the embodiments configures the illuminating fixture together with the light source load 3 comprising the semiconductor light emitting device (LED module).

In other words, this illuminating fixture includes the lighting apparatus 1, and the light source load (DC light source) 3 configured to receive electric power from the lighting apparatus 1.

Figure 15:
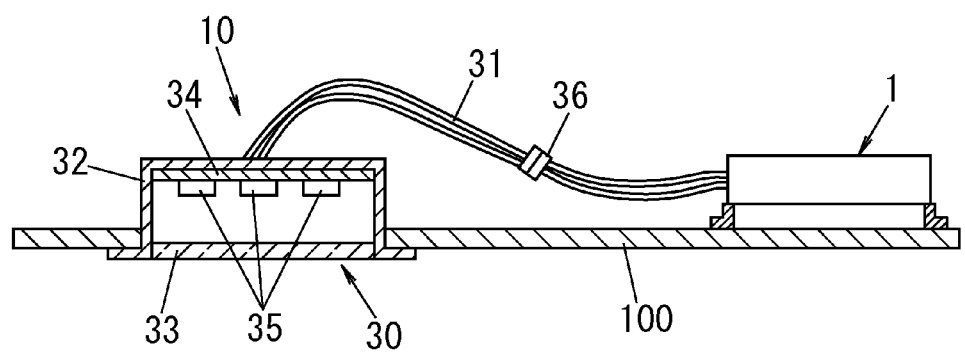
FIG. 15 is a sectional view illustrating the illuminating fixture including the above lighting apparatus.

As shown in FIG. 15, in the illuminating fixture 10, the lighting apparatus 1 serving as a power supply unit is received in a case separate from an appliance housing 32 of an LED module 30 (the light source load 3). The lighting apparatus 1 is connected to the LED module 30 through the lead wires 31.

Therefore, the illuminating fixture 10 can implement the slimness of the LED module 30 and increase the degree of freedom of the installation place of the lighting apparatus 1 as a separate mounting type of the power supply unit.

In the example of FIG. 15, the appliance housing 32 is a cylinder shaped housing having an upper base and an opened bottom made of a metal material. The appliance housing has an opened surface (opened bottom surface) covered with a light diffusing plate 33.

In the LED module 30, a plurality of (herein, four) LEDs 35 are mounted on one surface of a substrate 34. The LED module 30 is disposed in a relationship opposite to (facing) the light diffusing plate 33 within the appliance housing 32.

The appliance housing 32 is buried in a ceiling 100 and is connected to the lighting apparatus 1 serving as the power supply unit disposed behind the ceiling through the lead wires 31 and the connectors 36.

The illuminating fixture 10 is not limited to a separate mounting type configuration in which the lighting apparatus 1 as the power supply unit is received in the case separate from that of the LED module 30. For example, the fixture 10 may be a power supply integrated type configuration in which the LED module 30 and the lighting apparatus 1 are received in the same housing.

Each lighting apparatus 1 described in the embodiments is not limited to be used for the illuminating fixture 10. Each lighting apparatus 1 may be used for various light sources, for example, a backlight of a liquid crystal display, a copier, a scanner, a projector, and the like.

Alternatively, the light source load 3 emitting light by receiving the power supply from the lighting apparatus 1 is not limited to the light emitting diode (LED). For example, the light source load 3 may comprise a semiconductor light emitting element such as, for example, an organic EL device, a semiconductor laser device, etc.

Figure 16:
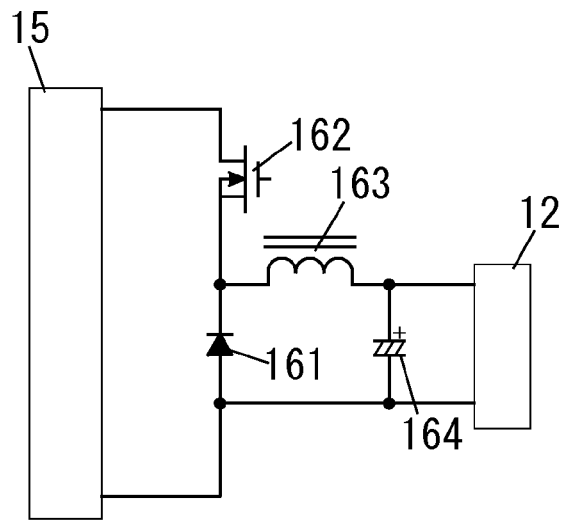
FIG. 16 is a circuit diagram illustrating the primary part of the other configuration of the above lighting apparatus.

Further, in each embodiment, the step-down chopper circuit 16 has a configuration in which the switching element 162 is connected to the low potential (negative) side of the output terminals of the DC power supply circuit 15 and the diode 161 is connected to the high potential (positive) side thereof, but it is not limited thereto. That is, the step-down chopper circuit 16 may have a configuration in which the switching element 162 is connected to the high potential side of the output terminals of the DC power supply circuit 15, as shown in FIG. 16.

Figure 17:
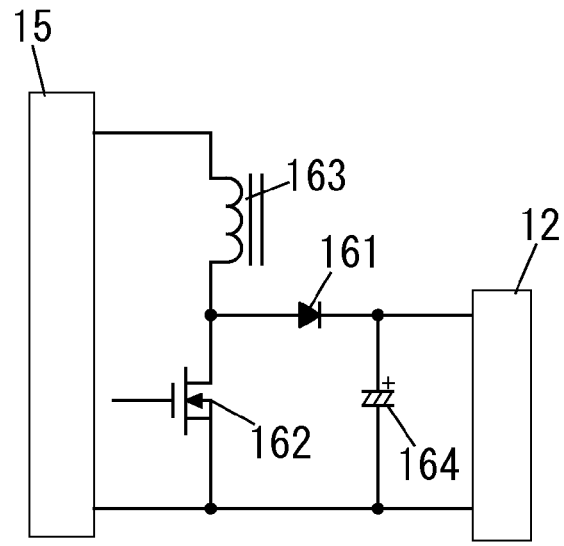
FIG. 17 is a circuit diagram illustrating the primary part of the other configuration of the above lighting apparatus.
Figure 18:
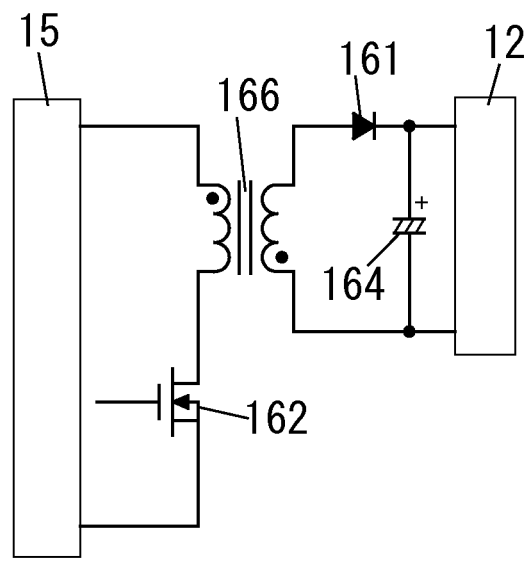
FIG. 18 is a circuit diagram illustrating the primary part of the other configuration of the above lighting apparatus.
Figure 19:
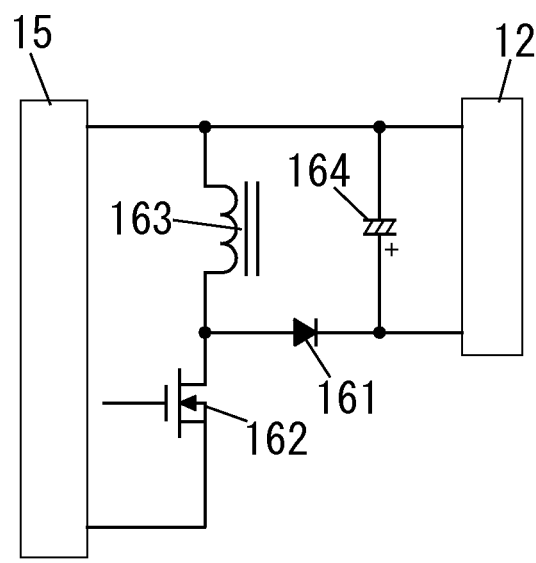
FIG. 19 is a circuit diagram illustrating the primary part of the other configuration of the above lighting apparatus.
Figure 20:
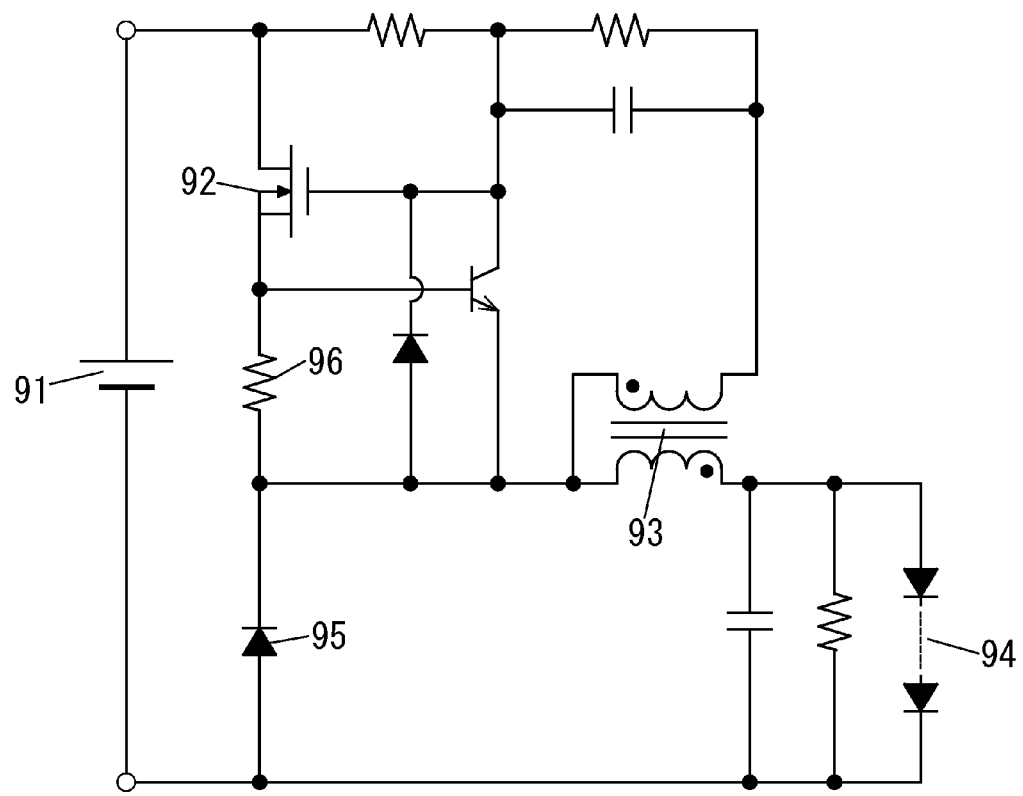
FIG. 20 is a circuit diagram illustrating the configuration of the prior lighting apparatus.

The lighting apparatus 1 is not limited to the configuration in which the step-down chopper circuit 16 is applied thereto but as shown in FIGS. 17 to 19, may include various switching power supply circuits other than the step-down chopper circuit formed between the DC power supply circuit 15 and the output connector 12. FIG. 17 shows the instance in which the step-up chopper circuit is applied, FIG. 18 shows the instance in which a flyback converter circuit is applied, and FIG. 19 shows the instance in which the step-down and step-up chopper circuit is applied.

The step-up chopper circuit shown in FIG. 17 is configured so that the inductor 163 and the switching element 162 are connected in series between the output terminals of the DC power supply circuit 15, and the diode 161 and the output capacitor 164 are connected in series between the both terminals of the switching element 162.

The flyback converter circuit shown in FIG. 18 is configured so that a primary winding of a transformer 166 and the switching element 162 are connected in series between the output terminals of the DC power supply circuit 15, and the diode 161 and the output capacitor 164 are connected in series to each other and connected in parallel with a secondary winding of the transformer 166.

The step-down and step-up chopper circuit shown in FIG. 19 is configured so that the inductor 163 and the switching element 162 are connected in series between the output terminals of the DC power supply circuit 15, and the diode 161 and the output capacitor 164 are connected in series to each other and connected in parallel with the inductor 163.

The invention claimed is:

1. A lighting apparatus comprising:
   a switching regulator configured to supply a direct current to a DC light source; and
   a control circuit configured to control said switching regulator in order to supply a direct current having a magnitude corresponding to a dimming ratio to the DC light source,
   wherein said switching regulator includes a switching element, and
   said control circuit is configured to adjust a switching frequency and on-duration of said switching element in accordance with the dimming ratio, and
   said control circuit is configured to, when the dimming ratio falls within a first dimming range, adjust the switching frequency to a frequency associated with the first dimming range and adjust the on-duration to duration associated with the dimming ratio in a range of the on-duration associated with the first dimming range, and
   said control circuit is configured to, when the dimming ratio falls within a second dimming range different from the first dimming range, adjust the on-duration to duration associated with the second dimming range and adjust the switching frequency to a frequency associated with the dimming ratio in a range of the switching frequency associated with the second dimming range.

2. A lighting apparatus as set forth in claim 1, wherein said control circuit is configured to, when said control circuit lights the DC light source at full power, adjust the switching frequency to a predetermined standard frequency and adjust the on-duration to predetermined standard on-duration, and a combination of the standard frequency and the standard on-duration is a combination of the switching frequency and the on-duration associated with luminance of the DC light source used as a unit amount of the dimming ratio.

3. A lighting apparatus as set forth in claim 2, wherein
said switching regulator includes an inductor connected in series with said switching element, and
said switching regulator is configured to store energy from a power source in said inductor while said switching element is turned on, and to provide the energy stored in said inductor to the DC light source while said switching element is turned off, and
the standard frequency and the standard on-duration are selected such that a current flows through said inductor in a critical mode or a discontinuous mode.

4. A lighting apparatus as set forth in claim 1, wherein
said control circuit is configured to output a driving signal in accordance with the dimming ratio to said switching element, and
the driving signal is a periodic voltage signal, and has an on-period in which the driving signal has a voltage exceeding a threshold for turning on said switching element, and an off-period in which the driving signal has the voltage falling below the threshold, and
the on-duration is determined by to the on-period of the driving signal, and
the switching frequency is determined by a frequency of the driving signal.

5. A lighting apparatus as set forth in claim 4, wherein
said control circuit is configured to measure a driving current flowing from said control circuit to said switching element while the driving signal is outputted, and
said control circuit is configured to, when the driving current rises to a first predetermined value, switch the driving signal from the on-period to the off-period, and,
said control circuit is configured to adjust the on-duration by means of adjusting the first predetermined value.

6. A lighting apparatus as set forth in claim 5, wherein
said control circuit is configured to adjust the first predetermined value to a value not greater than zero in order to turn off the DC light source.

7. A lighting apparatus as set forth in claim 4, wherein
said control circuit includes:
a capacitor charged with the driving signal; and
a discharging speed circuit configured to determine a discharging speed of said capacitor in accordance with a second predetermined value, and said control circuit is configured to, when a voltage across said capacitor decreases down to a predetermined threshold, switch the driving signal from the off-period to the on-period, and,
said control circuit is configured to adjust the frequency of the driving signal by means of adjusting the second predetermined value.

8. A lighting apparatus as set forth in claim 7, wherein
said control circuit is configured to adjust the second predetermined value to a value not greater than zero in order to turn off the DC light source.

9. A lighting apparatus as set forth in claim 1, wherein
said control circuit is configured to receive a dimming signal indicative of the dimming ratio.

10. A lighting apparatus as set forth in claim 1, wherein
a minimum of the switching frequency is 1 kHz.

11. A lighting apparatus as set forth in claim 1, wherein
the first dimming range is defined as a range having a lower limit not less than a predetermined dimming ratio, and
the second dimming range is defined as a range having an upper limit less than the predetermined dimming ratio, and
the range of the switching frequency associated with the second dimming range has an upper limit not greater than the frequency associated with the first dimming range, and
the duration associated with the second dimming range is not greater than the duration associated with the predetermined dimming ratio in the range of the on-duration associated with the first dimming range.

12. A lighting apparatus as set forth in claim 1, wherein
the second dimming range is defined as a range having a lower limit not less than a predetermined dimming ratio, and
the first dimming range is defined as a range having an upper limit less than the predetermined dimming ratio, and
the range of the on-duration associated with the first dimming range has an upper limit not greater than the duration associated with the second dimming range, and
the frequency associated with the first dimming range is not greater than the frequency associated with the predetermined dimming ratio in the range of the switching frequency associated with the second dimming range.

13. An illuminating fixture comprising:
a lighting apparatus defined by claim 1; and
a DC light source configured to receive electric power from said lighting apparatus.

* * * * *